(12) United States Patent
Kteily et al.

(10) Patent No.: US 11,224,931 B2
(45) Date of Patent: Jan. 18, 2022

(54) MOTION CONTROL METHOD AND SYSTEM FOR SERVICING OF WELDING TORCH

(71) Applicant: NASARC TECHNOLOGIES, INC., Waterloo (CA)

(72) Inventors: Naseem Kteily, Waterloo (CA); Michel Tremblay, Waterloo (CA); Taylor Machacek, Waterloo (CA)

(73) Assignee: NASARC TECHNOLOGIES INC., Waterloo (CA)

( * ) Notice: Subject to any disclaimer, the term of this patent is extended or adjusted under 35 U.S.C. 154(b) by 407 days.

(21) Appl. No.: 16/303,024

(22) PCT Filed: May 19, 2017

(86) PCT No.: PCT/CA2017/050612
§ 371 (c)(1),
(2) Date: Nov. 19, 2018

(87) PCT Pub. No.: WO2017/197529
PCT Pub. Date: Nov. 23, 2017

(65) Prior Publication Data
US 2019/0299321 A1 Oct. 3, 2019

Related U.S. Application Data

(60) Provisional application No. 62/339,311, filed on May 20, 2016.

(51) Int. Cl.
| | |
|---|---|
| *B23K 11/30* | (2006.01) |
| *B23P 19/02* | (2006.01) |
| *B23P 19/04* | (2006.01) |
| *B23K 9/32* | (2006.01) |

(52) U.S. Cl.
CPC .................................. *B23K 9/328* (2013.01)

(58) Field of Classification Search
CPC .... B23K 3/027; B23K 3/028; B23K 11/3072; B23K 9/32328; B23K 9/26; B23P 19/02; B23P 19/04
See application file for complete search history.

(56) References Cited

U.S. PATENT DOCUMENTS

| | | | | |
|---|---|---|---|---|
| 4,280,043 A | * | 7/1981 | Feix | ........................ B23K 9/328 |
| | | | | 219/137.31 |
| 4,733,050 A | | 3/1988 | Grafius | |
| | | (Continued) | | |

FOREIGN PATENT DOCUMENTS

| | | |
|---|---|---|
| CN | 1253241 A | 5/2000 |
| CN | 1742161 A | 3/2006 |
| | (Continued) | |

OTHER PUBLICATIONS

Extended European Search Report issued in Serial No. 17798466 dated Nov. 26, 2019, 14 pages.
(Continued)

*Primary Examiner* — Michael A Laflame, Jr.
(74) *Attorney, Agent, or Firm* — Pearne & Gordon LLP

(57) ABSTRACT

A system and method for servicing a welding torch is provided. The system includes a gripping module for holding and releasing a component of the welding torch, the gripping module is movable along an axis of the gripping module and rotatable about the axis; and a control system for providing a degree of freedom in a movement of the gripping module to control or reduce a force exerted between mating components of the welding torch.

17 Claims, 35 Drawing Sheets

(56) References Cited

U.S. PATENT DOCUMENTS

| | | | |
|---|---|---|---|
| 5,517,740 A * | 5/1996 | Costlow | B23P 19/025 |
| | | | 173/17 |
| 7,204,792 B2 * | 4/2007 | Hagihara | B23K 9/32 |
| | | | 483/13 |
| 2002/0162327 A1 | 11/2002 | Stephenson et al. | |
| 2005/0211684 A1 | 9/2005 | Jaeger et al. | |
| 2006/0231538 A1 * | 10/2006 | Rice | B23K 9/32 |
| | | | 219/136 |
| 2007/0102479 A1 * | 5/2007 | Kan | B23K 9/126 |
| | | | 228/45 |
| 2015/0027497 A1 * | 1/2015 | Distler | B08B 7/0021 |
| | | | 134/7 |

FOREIGN PATENT DOCUMENTS

| | | | |
|---|---|---|---|
| CN | 102861975 A | 1/2013 | |
| JP | H0323078 A | 1/1991 | |
| WO | 2004065798 A1 | 8/2004 | |
| WO | 2016000083 A1 | 1/2016 | |

OTHER PUBLICATIONS

Office action issued in corresponding Chinese Patent Application No. 201780044296 dated Jul. 31, 2020, 15 pages.
Search report issued in issued in corresponding Chinese Patent Application No. 201780044296 dated Jul. 23, 2020, 3 pages.
Office action issued in corresponding Japanese Patent Application No. 2018-561030 dated Mar. 23, 2021, 4 pages.
Yu, et al. "The Powder Metallurgy mold design manual (3rd edition)(Chinese Edition)." 5 pages.
European examination report dated Nov. 26, 2019 in the related European Application No. EP17798466.3, 13 pages.
Japanese Office action issued in corresponding application No. 2018-561030 dated Oct. 7, 2021, 7 pages.

* cited by examiner

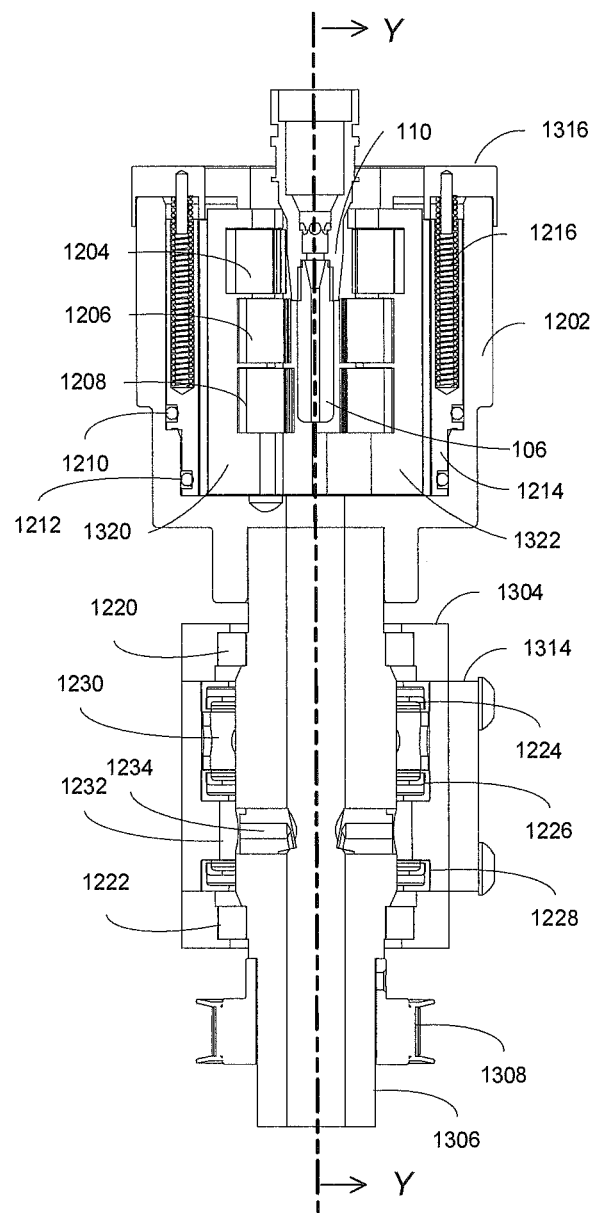 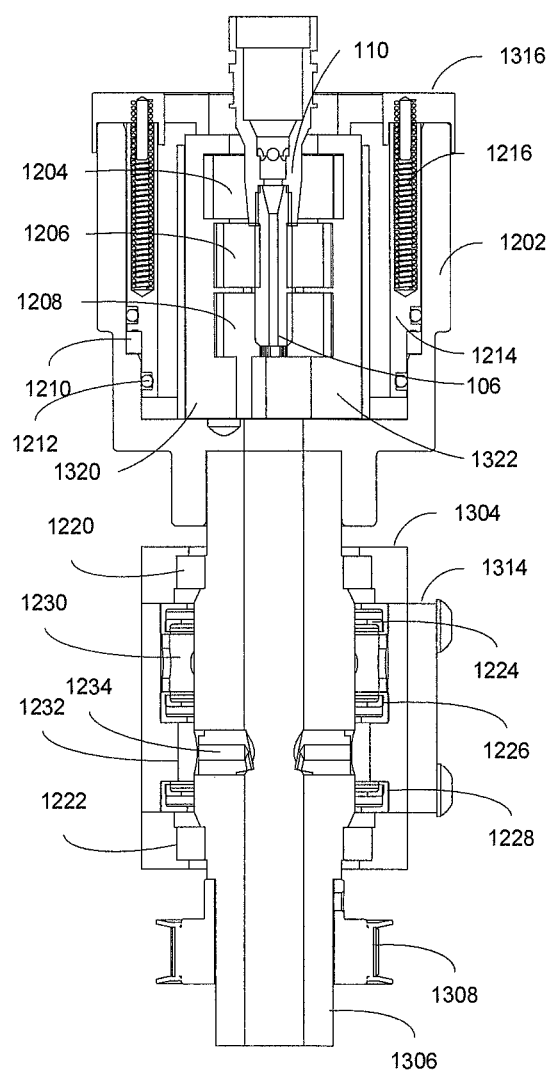
FIG. 13 (c)  FIG. 13 (d)

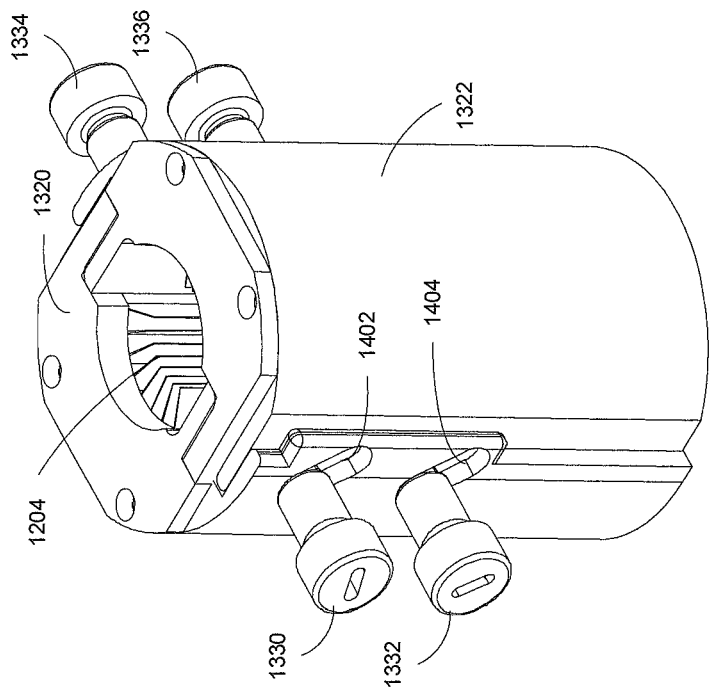
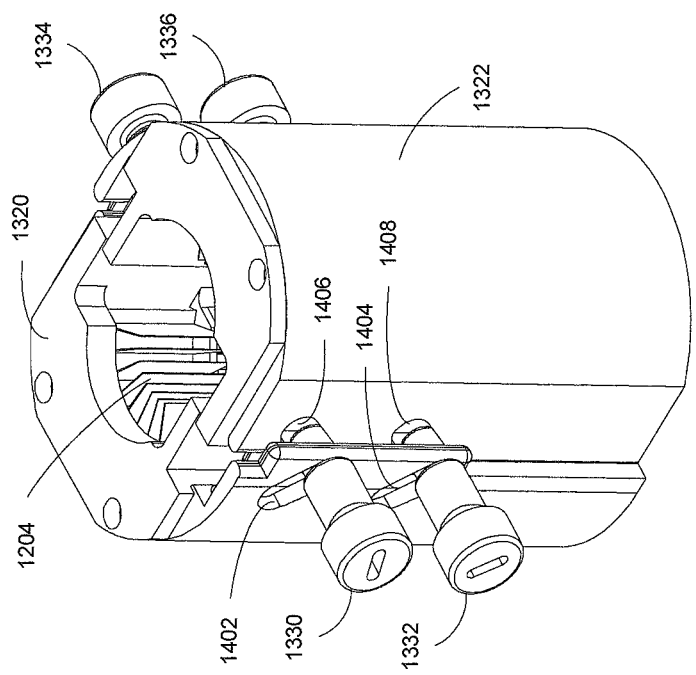
FIG. 14 (b)
FIG. 14 (a)

MOTION CONTROL METHOD AND SYSTEM FOR SERVICING OF WELDING TORCH

FIELD OF THE INVENTION

The present invention relates to welding torches, and more specifically, a method and system for controlling the servicing of welding torches.

BACKGROUND OF THE INVENTION

Welding torches are widely used to join separate workpieces. One example of welding techniques using welding torches is a metal-inert-gas ("MIG") arc welding technique in which a relatively fine wire electrode is fed continuously from a large spool with a variable speed drive whose speed is controlled to optimize arc length and burnoff rate. A welding torch is connected to a gas supply. During the welding process, the electrical arc that extends between the electrode and the metal surfaces that are being welded, is shielded within a gas flow.

Various tools have been developed for servicing welding torches, e.g., tools for cleaning nozzles and/or replacing contact tips. However there exists a growing demand for automated servicing of welding torches, with accurate control. There is therefore a need to provide improved ways for servicing welding torches.

BRIEF DESCRIPTION OF THE DRAWINGS

These and other features of the invention will become more apparent from the following description in which reference is made to the appended drawings wherein:

FIGS. 14(a) and 14(b) show positions of brush support frames of the tip and retaining head cleaning module;

DETAILED DESCRIPTION

Figure 1:
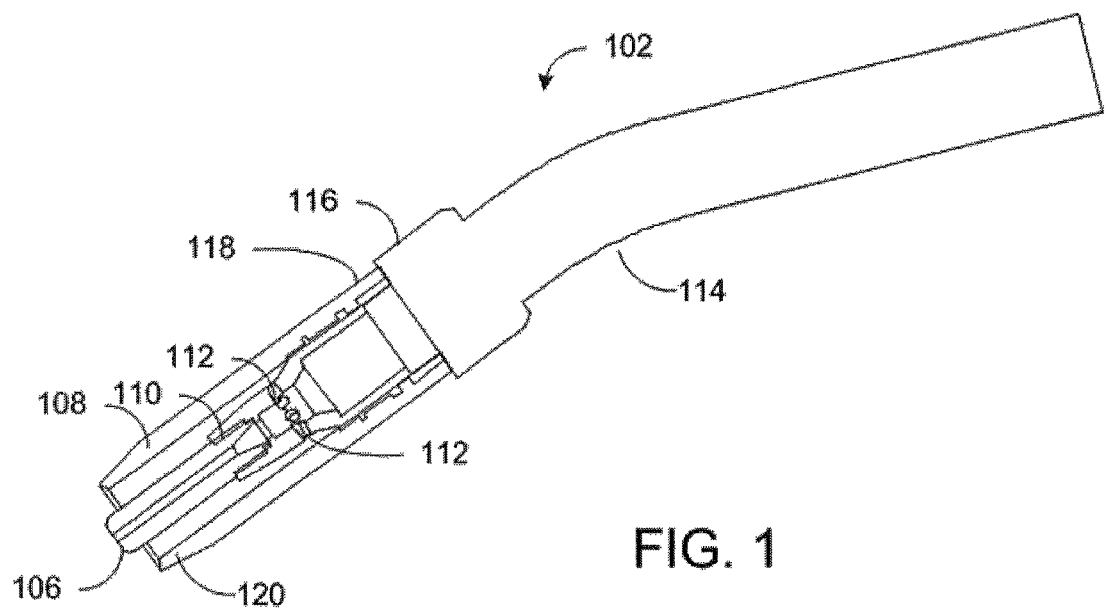
FIG. 1 is a cross sectional view of one example of a welding torch.

Systems and methods for welding torches are described below, by way of example only, with reference to FIGS. 1-31. The systems and methods described herein generally relate to servicing of welding torches, and to force and/or position control of components/objects in systems for automated maintenance and/or servicing of the welding torches. The systems and methods described herein provide a control system configured to control the amount of force exerted between components and/or a relative position between components in the systems. The system may use a force control to move a component to a particular position or use a position control so that the amount of force reaches a particular value. Force exerted between components in the systems or a relative position between components may be measured by various ways, and may be controlled, for example, in an open or closed loop control manner. The control system provides a degree of freedom in a movement of a component in the interaction of two mating components of the welding torch.

In the exemplary implementation, a float system is provided to perform a force and/or position control in respect to welding nozzles and/or contact tips. For example, the float system may control a device configured to remove a gas nozzle from a welding torch, clean the gas nozzle, and/or replace the gas nozzle. The float system may control a device configured to remove and dispose a spent contact tip, dispense a new contact tip, and put the new contact tip onto welding torches. For example, the float system is configured to control or reduce force between two mating components of the welding torch by controlling force exerted by a module in the interaction of the two mating components of the welding torch.

Various operations may be described herein using multiple actions in turn, by way of example only. The operations/actions described herein may be implemented in a different order, and the present disclosure is not limited to those specific examples.

The terms "system", "device", "module", "component", "tool", or "apparatus" herein may be used interchangeably. The system, device, module, component, tool, or apparatus described herein may be a hardware based system or a combination of the hardware based system and a software based computer system which may include multiple (computer) components or installations operably connected to each other, each of which may include one or more programmable processors, one or more memories, and one or more hardware and/or software based user interfaces.

References to relative terms, such as "vertical (vertically)", "upper", "lower", "angled", "upwards", and "downwards", are made herein for explanation purposes only. The arrangement and orientation of systems, devices and/or apparatuses as shown herein is not limited to those as described or as illustrated in the drawings.

FIG. 1 illustrates one example of a welding torch, indicated as 102. The welding torch 102 includes an open cylindrical nozzle 108 and a central, electrically charged welding tip 106 for extending weld wire (not shown). The welding tip 106 is attached to a retaining head 110, the retaining head 110 (also known as a diffuser or contact tip holder) being connected to a gas source (not shown) and including holes 112 for distributing gas into the nozzle 108 to control the welding environment at the weld. At a proximal end 118 of the nozzle 108, the nozzle 108 may be mounted to a welding arm or collar 116 of the welding torch 102. The connection between the nozzle 108 and the welding arm or collar 116 of the welding torch 102 may be of a threaded, bayonet, slip-on or other types. The welding tip 106 may be connected to the retaining head 110 via a thread or other means, and is in a concentric relationship with the nozzle 108. The welding tip 106 may protrude a distal end 120 of the nozzle 108. The welding torch 102 may be bent at a location adjacent to the collar 116 and thus forming a "goose neck" 114.

The welding torch 102 may be on a robotic arm (not shown) so that it moves between various defined three dimensional coordinates, for example, under the control of its programmable controller.

The welding tip 106 guides the wire electrode toward the weld site. A flow of inert gas distributed by the retaining head 110 concentrically surrounds the welding tip 106 and maintains a gas shield around the wire electrode to avoid inclusion of contaminants in the weld.

In one exemplary implementation, a welding torch maintenance center is provided for servicing of welding torches, such as the welding torch 102. The welding torch maintenance center includes a plurality of apparatuses/systems/modules. For example, the welding torch maintenance center may include a tool for removing and cleaning the nozzle 108 and tools for cleaning the welding tip 106 and/or the retaining head 110, depicted as a welding torch maintenance apparatus 200 shown in, for example, FIG. 2. The welding torch maintenance center may include a tool for replacing the welding tip 106, depicted as a welding tip changing apparatus 1500 shown in, for example, FIG. 15. The welding tip changing apparatus 1500 may be located in proximity to the welding torch maintenance apparatus 200. Some or all tools/apparatuses may be located within a single enclosure in the torch maintenance center. The welding torch 102 may be part of a robot or a robotic arm and is moved in a coordinated fashion between the various tools of the welding torch maintenance center. The servicing of the welding torch 102 may be completed in a single run between the various tools. Alternatively, various tools may be used separately for their individual functions.

In one exemplary implementation, the float system is employed in the welding torch maintenance apparatus (e.g., 200), the welding tip changing apparatus (e.g., 1500), or a combination thereof. The float system may be driven by pneumatic means, electric means, magnetic means, mechanical means, or hydraulic means which are controlled by a programmable control unit that interfaces with the robot control system.

Figure 2:
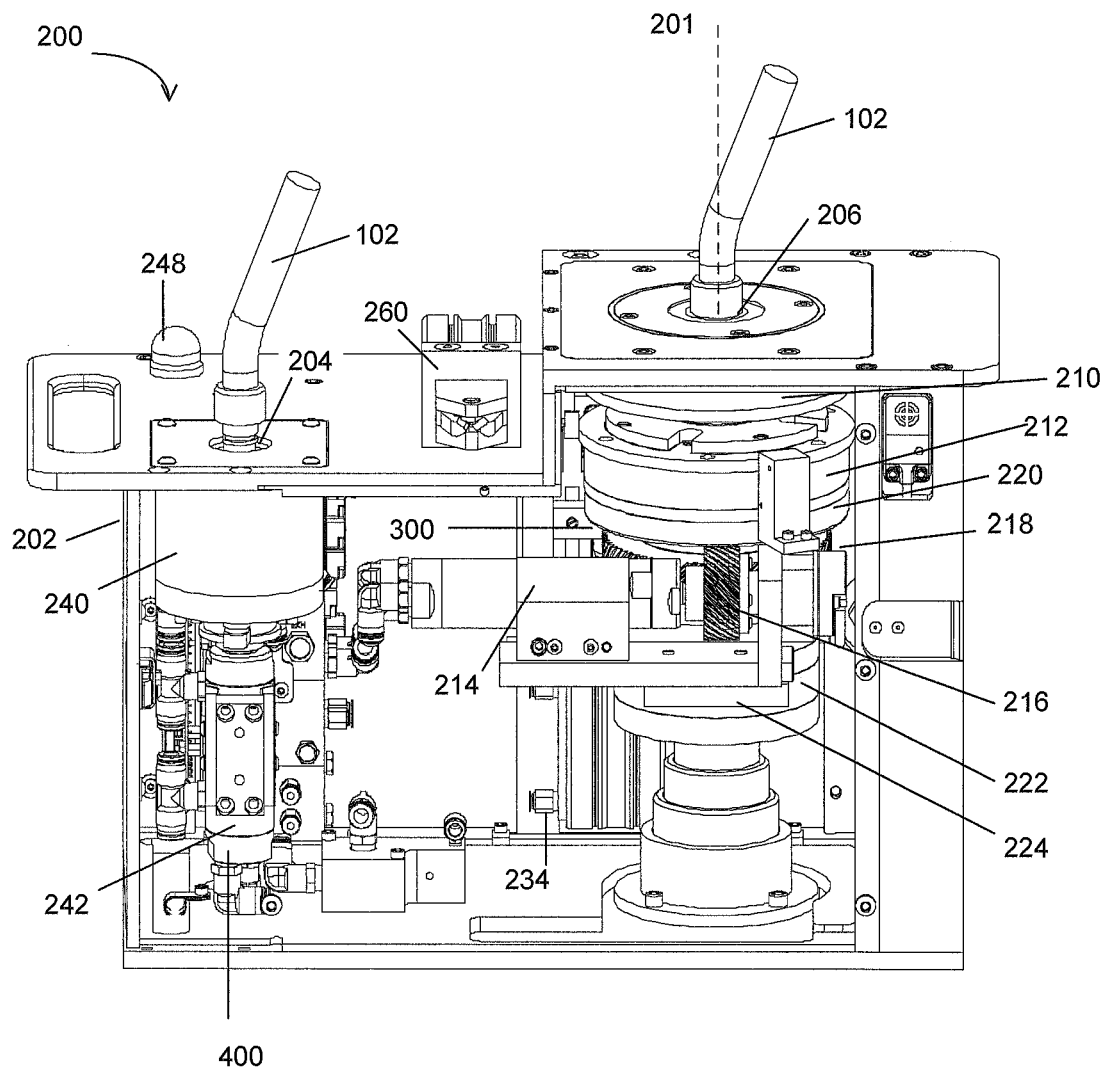
FIG. 2 is a perspective view of an example of a welding torch maintenance apparatus.

FIG. 2 illustrates one example of the welding torch maintenance apparatus 200. In the illustrated example, the welding torch maintenance apparatus 200 includes a nozzle removal apparatus for removing and cleaning the nozzle 108 of the welding torch 102 and a tip and retaining head cleaning module 400 for cleaning the welding tip 106 and/or the retaining head 110 of the welding torch 102. The nozzle removal apparatus includes a nozzle removal system 300 as shown in FIG. 3.

Figure 3:
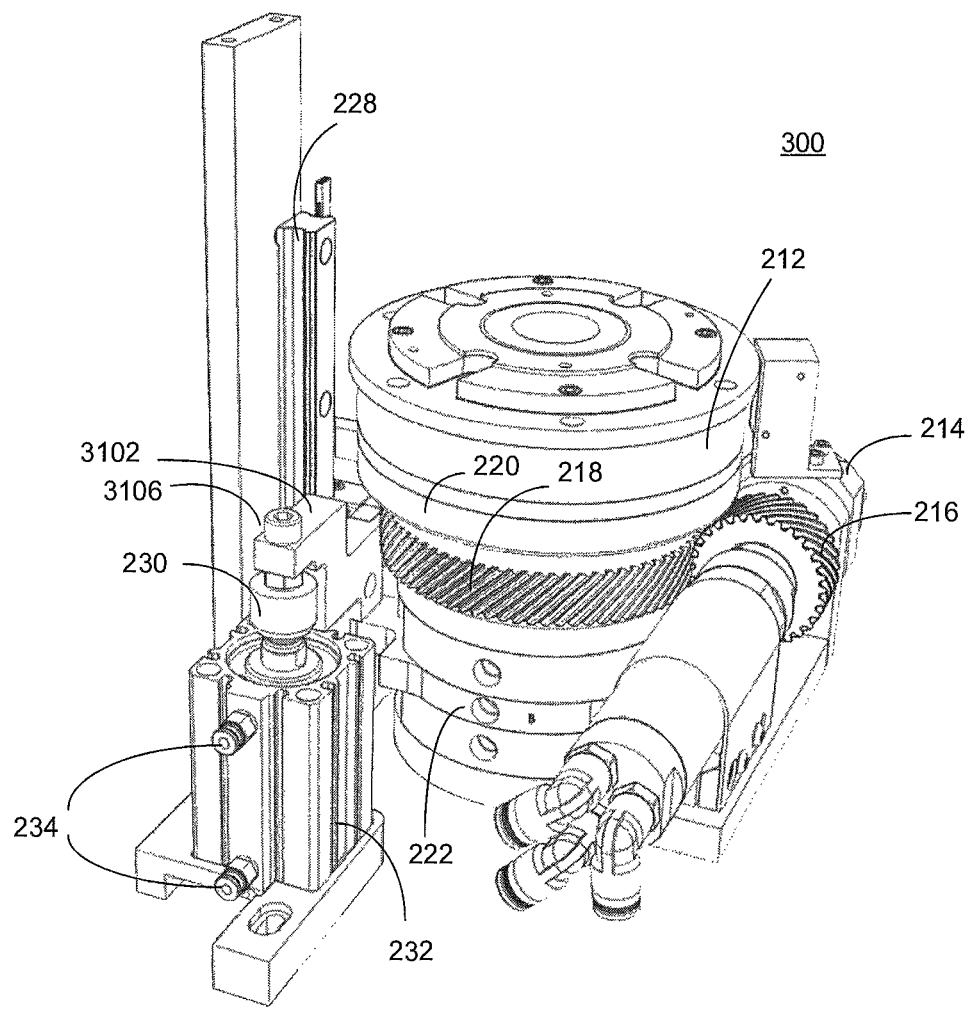
FIG. 3 is a perspective view of an example of a nozzle removal system which may be installed in the welding torch maintenance apparatus of FIG. 2.

Referring to FIGS. 1-3, the nozzle removal system 300 and the tip and retaining head cleaning module 400 is enclosed in an enclosure 202. The welding torch maintenance apparatus 200 may include valve banks for controlling the operations of the various pneumatic drive means and/or include a status light 248 on the enclosure 202 to indicate the operation status of the welding torch maintenance apparatus 200.

The welding torch maintenance apparatus 200 may include a welding wire cutter 260 for clipping the end of the weld wire from the welding tip 106. Wire cutting is particularly important if a ball of molten metal is formed on the welding wire (not shown). Wire cutting may be performed before servicing of the welding torch 102 starts, and may optionally be performed a second and/or a third time to remove weld wire exposed during operation. Alternatively, the exposed wire may be retracted instead of being cut in order to save operational time.

The tip and retaining head cleaning module 400 includes the tip and retaining head cleaning assembly 240, and a pneumatic air motor 242.

The nozzle removal system 300 uses a first clamp 210 and a second clamp 212. The first clamp 210 is adapted to fixedly engage a portion of the welding torch 102 at the goose neck 114 or at another defined point in the operational space of the robotic arm. The first clamp 210 may include a plurality of moveable, cooperative gripping inserts, for example, jaws of a collet, which is adapted to receive and fasten the welding torch 102 in a releasably clamped relation therebetween. In the example, the gripping inserts are in an equidistantly spaced relation around a rotational axis 201. Once the first clamp 210 fastens the welding torch 102 in position, a central axis of the nozzle 108 of the welding torch 102 is in alignment with the rotational axis 201.

The second clamp 212 is provided for holding the nozzle 108 and may have a similar or identical structure as the first clamp 210. The second clamp 212 is movable between a closing position, in which the gripping inserts are extended to clamp and hold the nozzle 108, and a retracted and open position in which gripping inserts are positioned out of the closing relation. The second clamp 212 is further adapted to rotate about a central axis which is aligned with the rotational axis 201.

In the drawings one example of the configuration of each of the first and the second clamps 210, 212 is shown for illustration purposes only. Other implementations for the first and the second clamps 210, 212 are readily available, for example, other pneumatically, hydraulically, magnetically, mechanically, or electrically controlled clamps, or a locking slider, for securing the welding torch 102 and the nozzle 108, respectively.

In operation, the second clamp 212 holds the nozzle 108 of the welding torch 102 and rotates about the rotational axis 201 to remove the nozzle 108. The rotation of the second clamp 212 may start prior to the second clamp 212 moving into the closing position. As the second clamp 212 holds and rotates the nozzle 108, the second clamp 212 may be actuated vertically to raise or lower the nozzle 108 to detach it from the welding torch 102. A cleaning means, for example, but not limited to, a brush, a reamer, high pressure air/fluid/spray, grinding or a milling means, or other cleaning tools, in turn enters the nozzle 108 from the distal end 120 and cleans the interior of the nozzle 108, as will be described below.

The nozzle removal system 300 includes a drive means for rotating the second clamp 212. In the illustrated example, the drive means includes a horizontal rotary pneumatic motor 214 and helical gears 216, 218 where the second clamp 212 is caused to rotate together with the rotation of the helical gear 218. The helical gear 218 is coupled to the second clamp 212 through a rotary air feed plate 220 so that the second clamp 212 is in pneumatic communication with an air distribution assembly 222 which operates to open and close the second clamp 212. The welding torch maintenance apparatus 200 may include a means for measuring rotational motion of the second clamp 212. It will be apparent to a person skilled in the art that other implementations are readily available, for example, other pneumatic, hydraulic, magnetic, mechanical or electrical motor arrangements.

The nozzle removal system 300 includes a lift system for moving the second clamp 212 vertically along the rotational axis 201. In the illustrated example the lift system is a pneumatic float system including a cylinder 232. The system may include a control device for controlling and coordinating various operations of system's components, and the control device may be configured to control air pressure or air volume in the cylinder 1534 and/or to control a position of the cylinder 232 which may be operated with a dump and fill manifold (see e.g., FIG. 27). The lift system may include movement detecting means to control the cylinder movement. For example, the movement detecting means may include potentiometers. It will be apparent to a person skilled in the art that other implementations are readily available, for example, rotary encoder, rotary potentiometer, rack and pinion, proximity sensors.

The nozzle removal system 300 includes a carriage (e.g., 226 of FIG. 30) that is slidable along a vertical rail 228. In the illustrated example, the carriage is fastened to a guide plate 224 of the air distribution assembly 222. The guide plate 224 secures and carries the second clamp 212, the rotary air feed plate 220, the horizontal rotary pneumatic motor 214 and the helical gears 216, 218. The carriage is attached to an alignment joint or floating connector 230 of the cylinder 232. The carriage slides along the vertical rail 228 when the cylinder 232 is driven pneumatically via air inlets 234. When actuated, the cylinder 232 carrying the carriage, together with the air distribution assembly 222, the second clamp 212, the rotary air feed plate 220, the horizontal rotary pneumatic motor 214 and the helical gears 216, 218, moves in the vertical direction.

Preferably, the rail 228 is mounted to a rigid structure, for example, a frame member of the welding torch maintenance apparatus 200. The rail 228 provides the directional guidance so that the second clamp 212, the rotary pneumatic motor 214, the helical gears 216, 218 and the air distribution assembly 222 moves in the vertical direction, when driven through the cylinder 232.

In the case of a threaded nozzle, the nozzle removal system 300 provides a degree of movement freedom in the vertical direction which compensates a potential offset between the thread pitch of the nozzle 108 and provides a buffer to accommodate the rotational speed and lift rate of the second clamp 212. As will be apparent to a person skilled in the art, the threads may likely not be aligned at the beginning of the process.

Figure 4A:
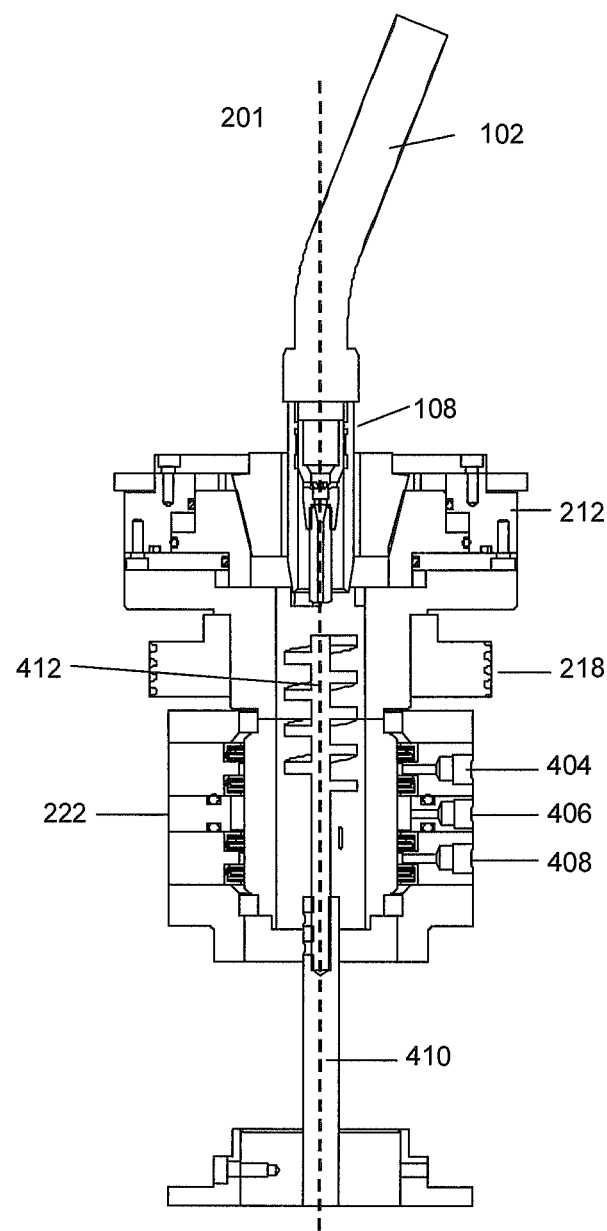
FIG. 4(a) is a sectional view of a nozzle removal system, where the nozzle is attached to the welding torch.
Figure 4B:
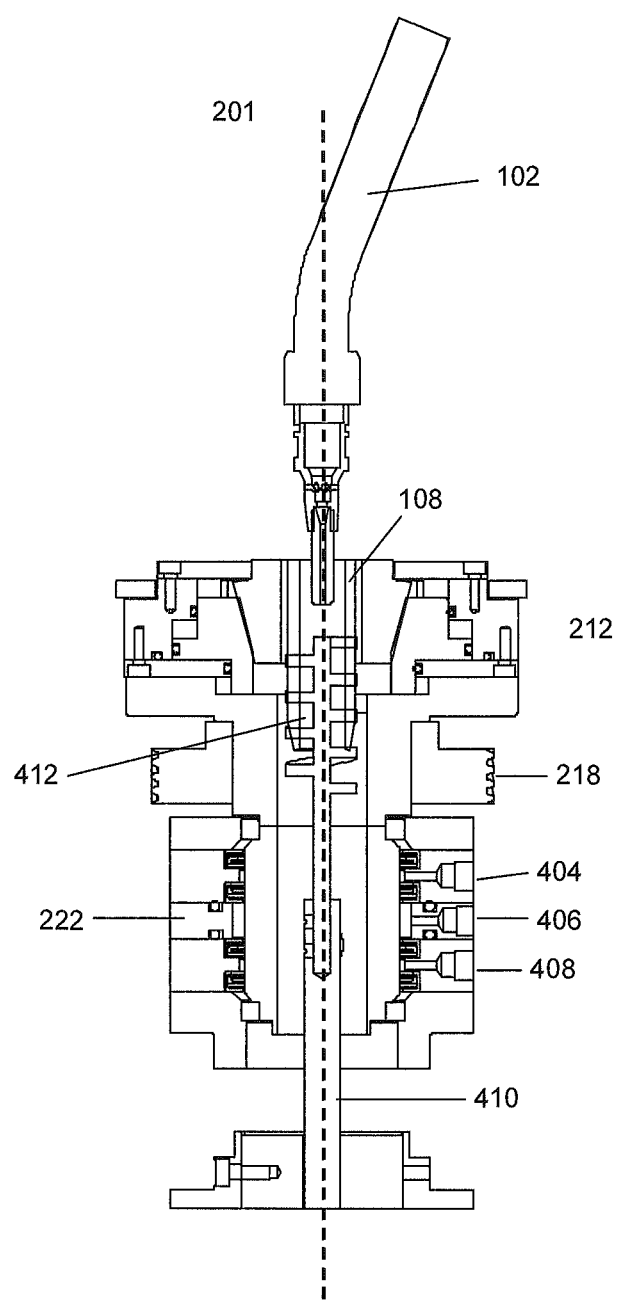
FIG. 4(b) is a sectional view of the nozzle removal system, where the nozzle is removed from the welding torch and the cleaning means enter the nozzle.

FIGS. 4(a) and 4(b) are sectional views of the nozzle removal system 300. The nozzle 108 is generally attached to the welding torch 102 and is secured by the second clamp 212 in FIG. 4(a). The second clamp 212 may be caused to open or close its clamps by the air distribution assembly 222 through air inlets 406, 408.

As described above, and in the case of a threaded nozzle the second clamp 212 is rotatable about the rotational axis 201 together with the gear 218, thereby disengaging a threaded portion of the nozzle 108 from the welding torch 102. As the second clamp 212 rotates, the second clamp 212 may simultaneously be actuated vertically to detach the nozzle 108 from the welding torch 102. To reattach the nozzle 108 to the welding torch 102, the second clamp 212 can rotate in the opposite direction about the same axis 201, engaging the threaded portion of the nozzle 108 to the welding torch 102.

With reference to FIG. 4(b), as the second clamp 212 holds and lowers the nozzle 108 to detach it from the welding torch 102, a cleaning means 412 may enter the nozzle 108 from the distal end 120 to clean the nozzle 108. The cleaning means 412 may be, for example, a brush, a reamer, high pressure air/fluid/spray, grinding, or a milling means which is mounted on a shaft 410. The nozzle 108 may continue to be rotated by the second clamp 212. The shaft 410 carrying the cleaning means 412 may be stationary, or alternatively, rotate with respect to the axis 201, for example, in a direction opposite from that of the second clamp 212. The shaft 410 may extend and/or retract in the vertical direction to enter and/or exit the nozzle 108. The relative movement between the nozzle 108 and the cleaning means 412 dislocates spatter accumulated on interior surfaces of the nozzle 108.

Figure 5:
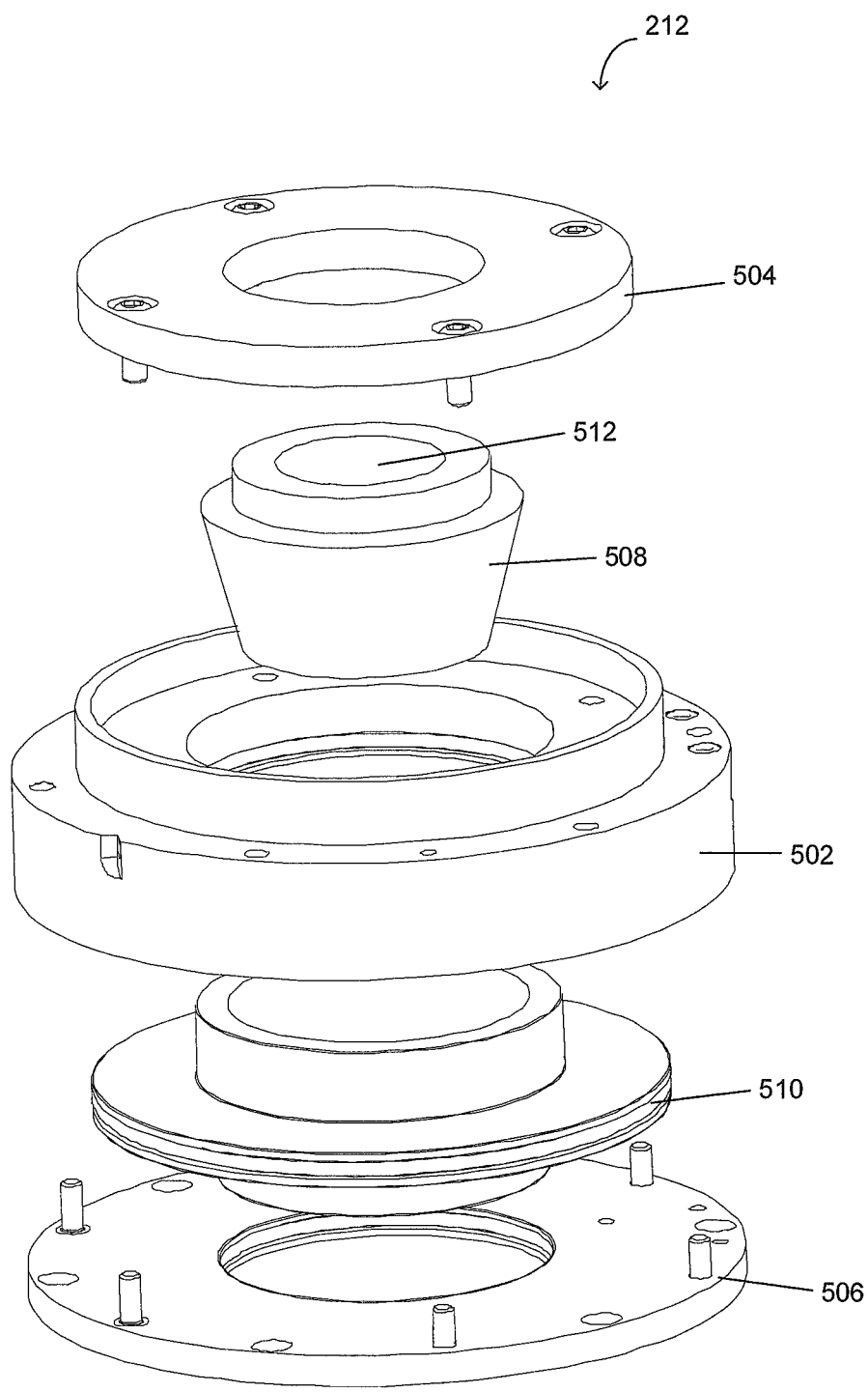
FIG. 5 is an exploded view of a second clamp.
Figure 6:
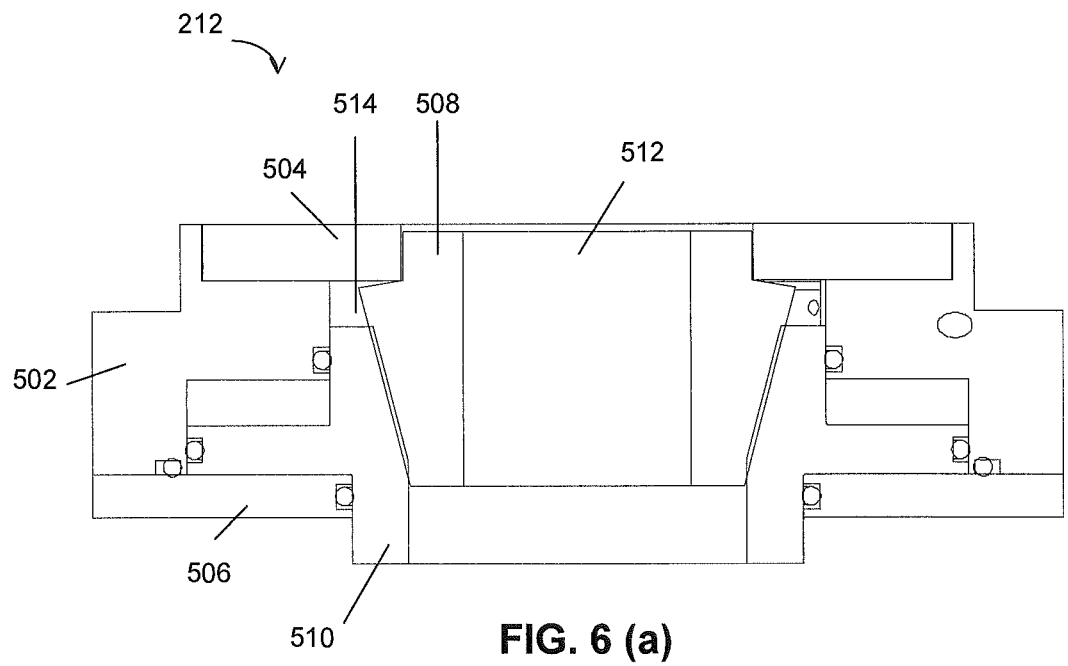
FIG. 6(a) is a cross-sectional view of the second clamp in an open position.
FIG. 6(b) is a cross-sectional view of the second clamp in a closed position.
Figure 6:
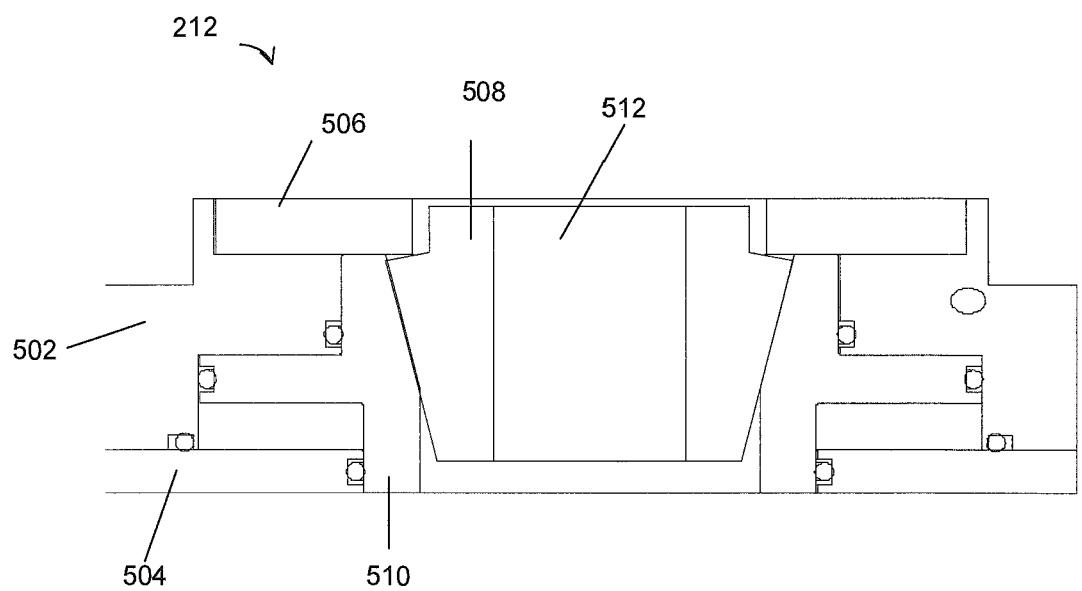

FIG. 5 is an exploded view of the second clamp 212. In this example, the second clamp 212 is a gripper collet. The second clamp 212 may include a gripper housing 502, a top cover 504, and a bottom cover 506, a collet 508, and matching taper 510. A collet 508 located in the gripper housing 502 includes a cylindrical inner surface defining a through opening 512 and a conical outer surface. The collet 508 may be made of, for example, spring steel. The collet 508 may be one-piece or may include a plurality of cooperative gripping jaws. A matching taper 510 engages the collet 508 and may have a tapered inner surface that can be caused to compress the collet 508 radially inwardly such that the inner surface of the collet 508 contracts to a slightly smaller opening diameter. The matching taper 510 is movable upon pneumatic activation in the vertical direction to transition the collet 508 between an open position and a closed position. The top cover 504 encloses the collet 508, and the bottom cover 506 encloses the taper 510 respectively to the gripper housing 502, by means of fasteners, for example, bolts, pins or shoulder screws.

FIG. 6(a) is a sectional view of the second clamp 212 in the open position, and FIG. 6(b) is a sectional view of the second clamp 212 in the closed position. As illustrated in FIG. 6(a), the taper 510 moves downwards emptying a head space 514 between the top cover 504 and the taper 510. The collet 508 in turn expands into the head space 514 thereby enlarging the diameter of the opening 512 to transition into the open position. In contrast, in FIG. 6(b), the taper 510 is moved upwards into the head space 514 thereby compressing the collet 508 radially inwardly to move into the closed position.

Figure 7:
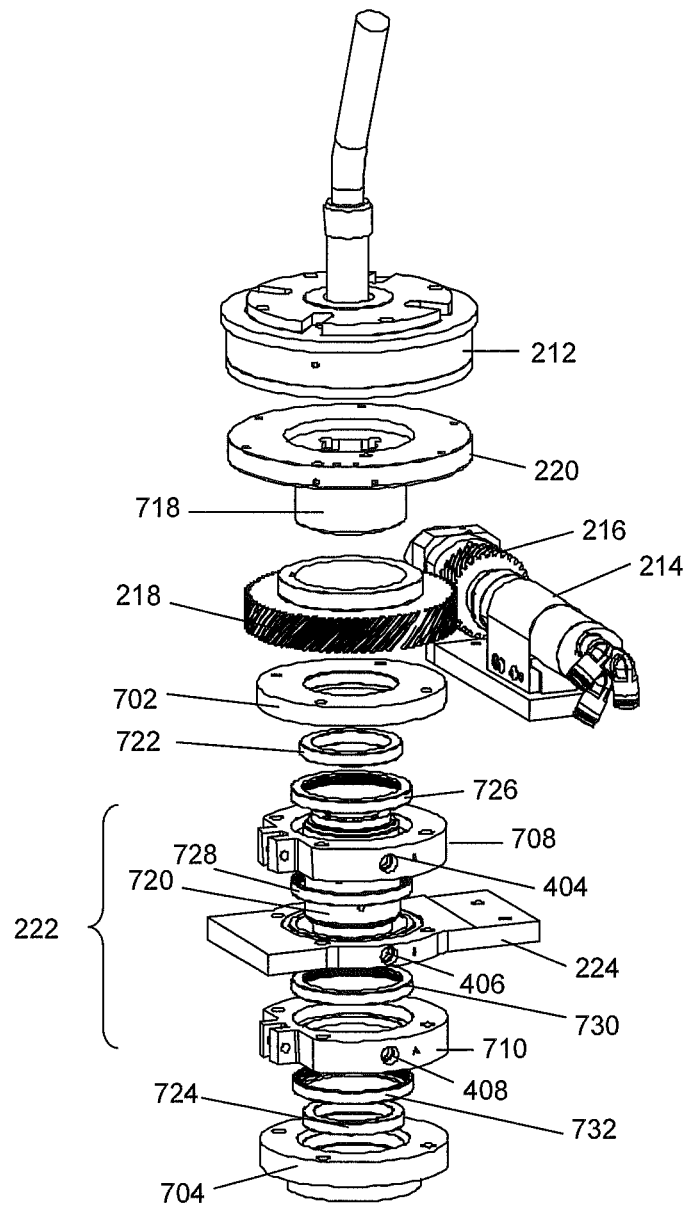
FIG. 7 is an exploded view of the second clamp, the rotary pneumatic motor, the helical gear and the air distribution assembly of the nozzle removal system.

FIG. 7 is an exploded view of the second clamp 212, the rotary pneumatic motor 214, the helical gears 216, 218 and the air distribution assembly 222. The air distribution assembly 222 is surrounded by an upper bearing cover 702 and a lower bearing cover 704. The air distribution assembly 222 comprises a pair of air distribution members 708, 710 with the guide plate 224 in between, each of the air distribution members 708, 710 and the guide plate 224 has a respective air inlet 404, 408, and 406. Through an application of pneumatic pressure to the respective air inlet 404, 406 and 408, the operation of the second clamp 212 can be controlled while the gear 218, the air feed plate 220 and the second clamp 212 rotate and move vertically as described above.

A hollow shaft 718, 720 is attached to the air feed plate 220. The hollow shaft 718, 720 passes through the air distribution members 708, 710 and the guide plate 224, and maintains concentric relationship thereto through bearings 722, 724. The hollow shaft 718, 720 may rotate relative to the air distribution members 708, 710 and the guide plate 224. Seal members 726, 728, 730, 732 are provided to each of the distribution members 708, 710 and the guide plate 224. When pneumatic pressure is applied, for example, to the air inlet 408, an air pocket in the form of a ring is formed between the distribution members 710, the shaft 720, and the seals 730, 732.

Figure 8:
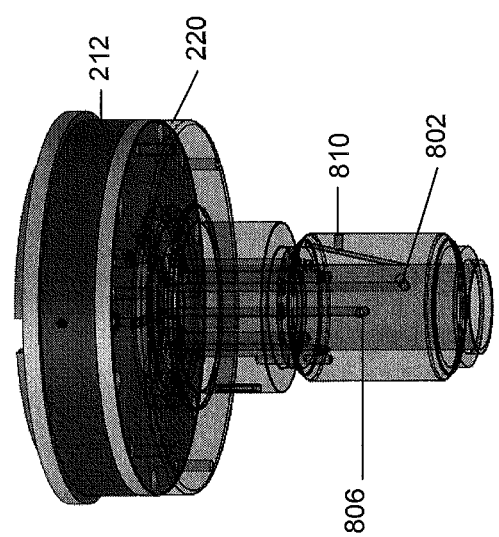
FIG. 8 shows a plurality of ducts embedded in the wall of the hollow shaft attached to the air distribution assembly.

Also referring to FIG. 8, a plurality of ducts are embedded in the wall of the hollow shaft 718, 720. A duct 802 links the ring-shaped air pocket created when pneumatic pressure is applied to the air inlet 408 with the air feed plate 220, and causes the collet 508 to close. A duct 806 links the ring-shaped air pocket created when pneumatic pressure is applied to the air inlet 406 with the air feed plate 220, and causes the collet 508 to open.

Figure 9A:
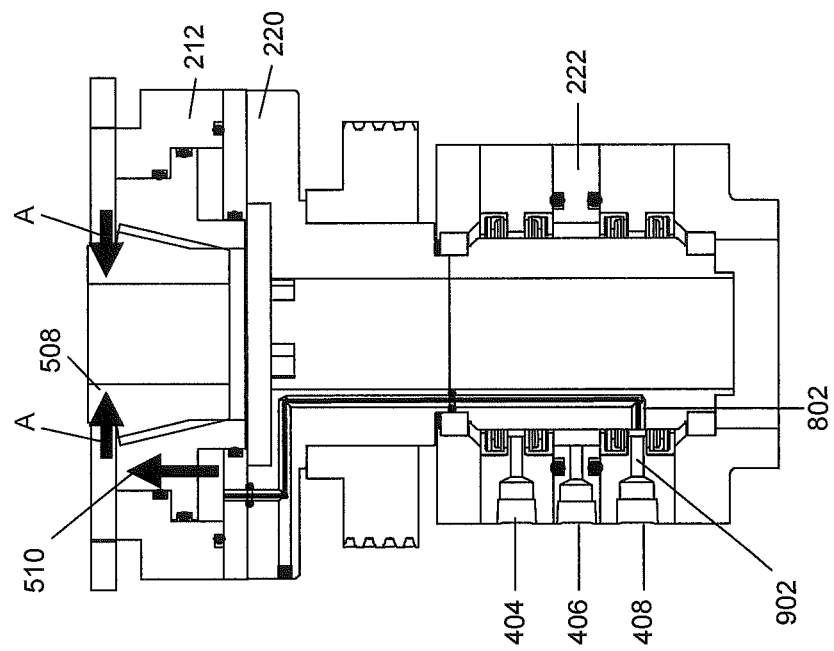
FIGS. 9(a)-9(c) are sectional views of the second clamp operated through air inlets from the air distribution assembly.
Figure 9C:
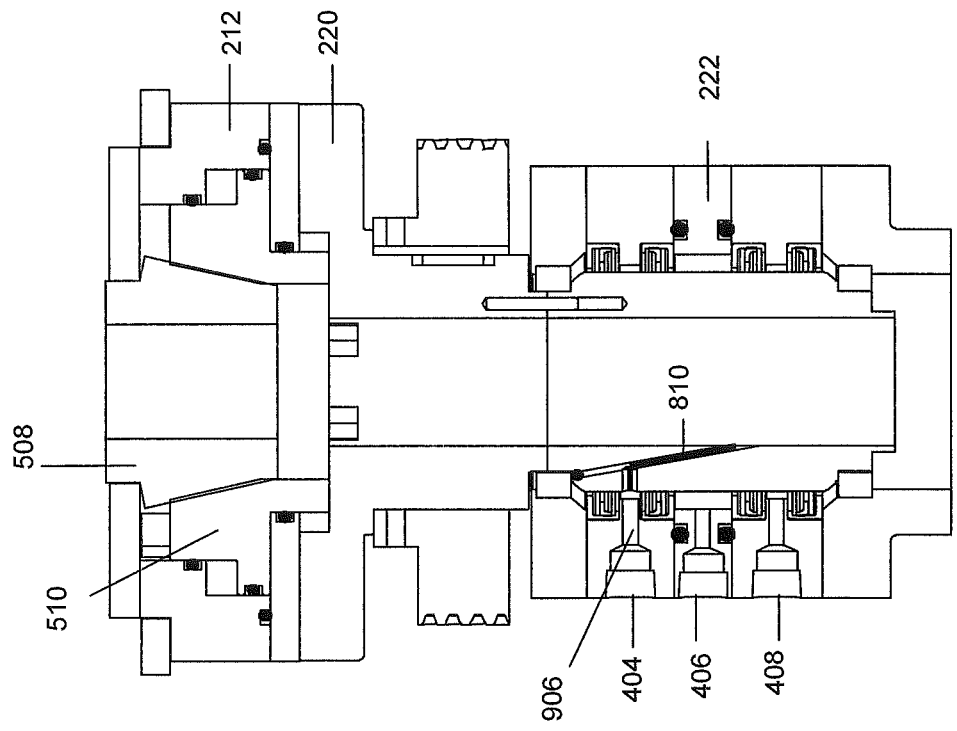
Figure 9B:
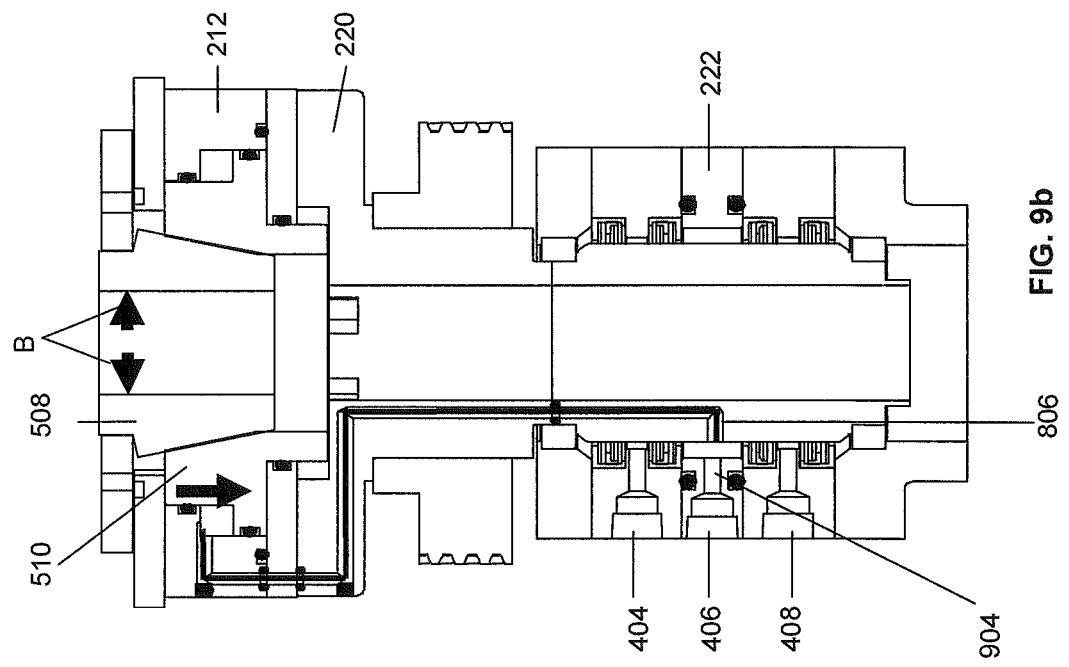

FIGS. 9(a)-9(c) are sectional views of the second clamp 212 operated through air inlets 404, 406, 408 from the air distribution assembly 222.

In FIG. 9(a), pneumatic pressure is applied to the air inlet 408. The pressure in the ring-shaped air pocket 902 around the shaft is transferred through the duct 802 and the air feed plate 220, causing the taper 510 to move upwardly and in turn compress the collet 508 radially inwardly to the closing position, as depicted by arrows A in FIG. 9(a).

In FIG. 9(b), pneumatic pressure is applied to the air inlet 406. The pressure in the ring-shaped air pocket 904 around the shaft is transferred through the duct 806 and the air feed plate 220, causing the taper 510 to move downwardly and in turn release the collet 508 radially outwardly to the open position, as depicted by arrows B in FIG. 9(b).

In FIG. 9(c), pneumatic pressure is applied to the air inlet 404. The pressure in the ring-shaped air pocket 906 around the shaft causes the air to enter duct 810, resulting in a venturi effect and creating a low pressure region in the hollow shaft. The low pressure will vacuum the spatter dislocated from the nozzle 108 through the bore of the hollow shaft.

Figure 10:
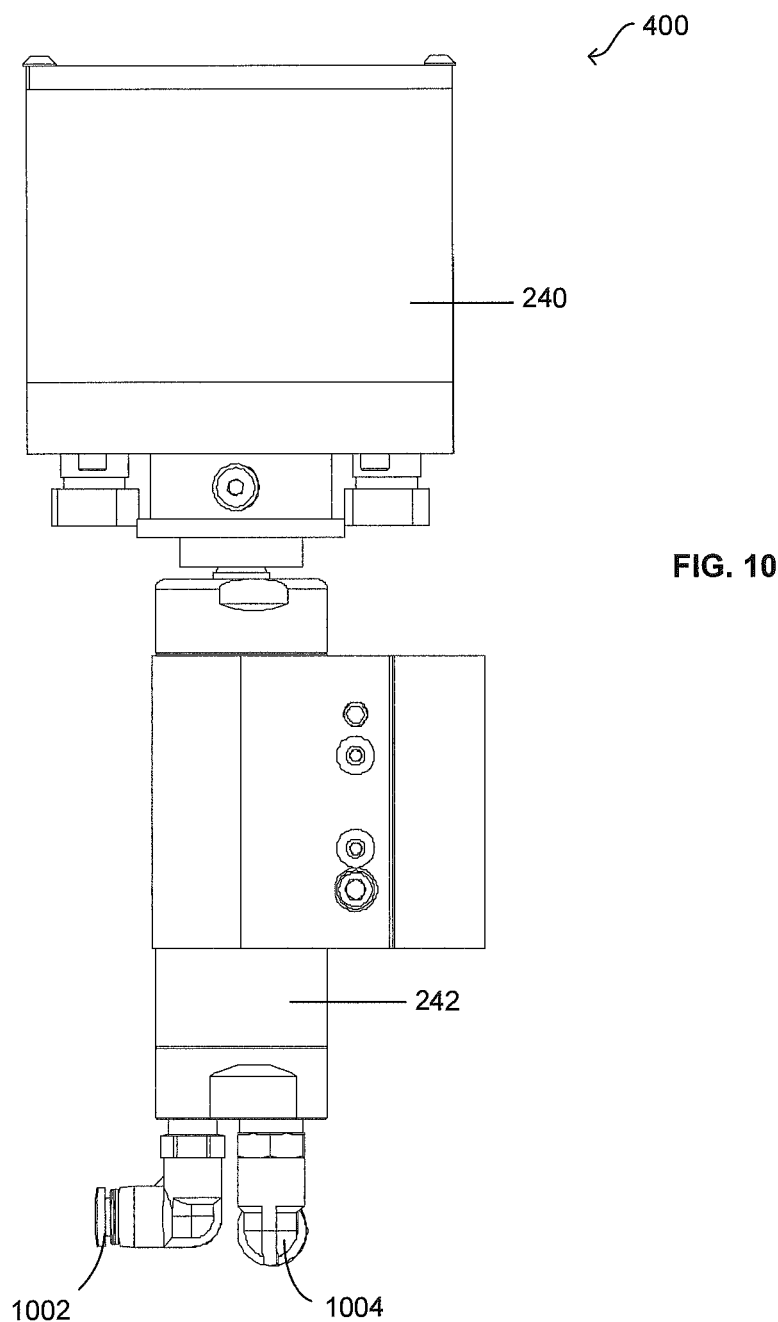
FIG. 10 shows one example of a tip and retaining head cleaning module.

FIG. 10 illustrates one example of the tip and retaining head cleaning module, indicated as 400, of the welding torch maintenance center. In this example, the tip and retaining head cleaning module 400 includes the tip and retaining head cleaning assembly 240 and a pneumatic air motor 242.

Figure 11:
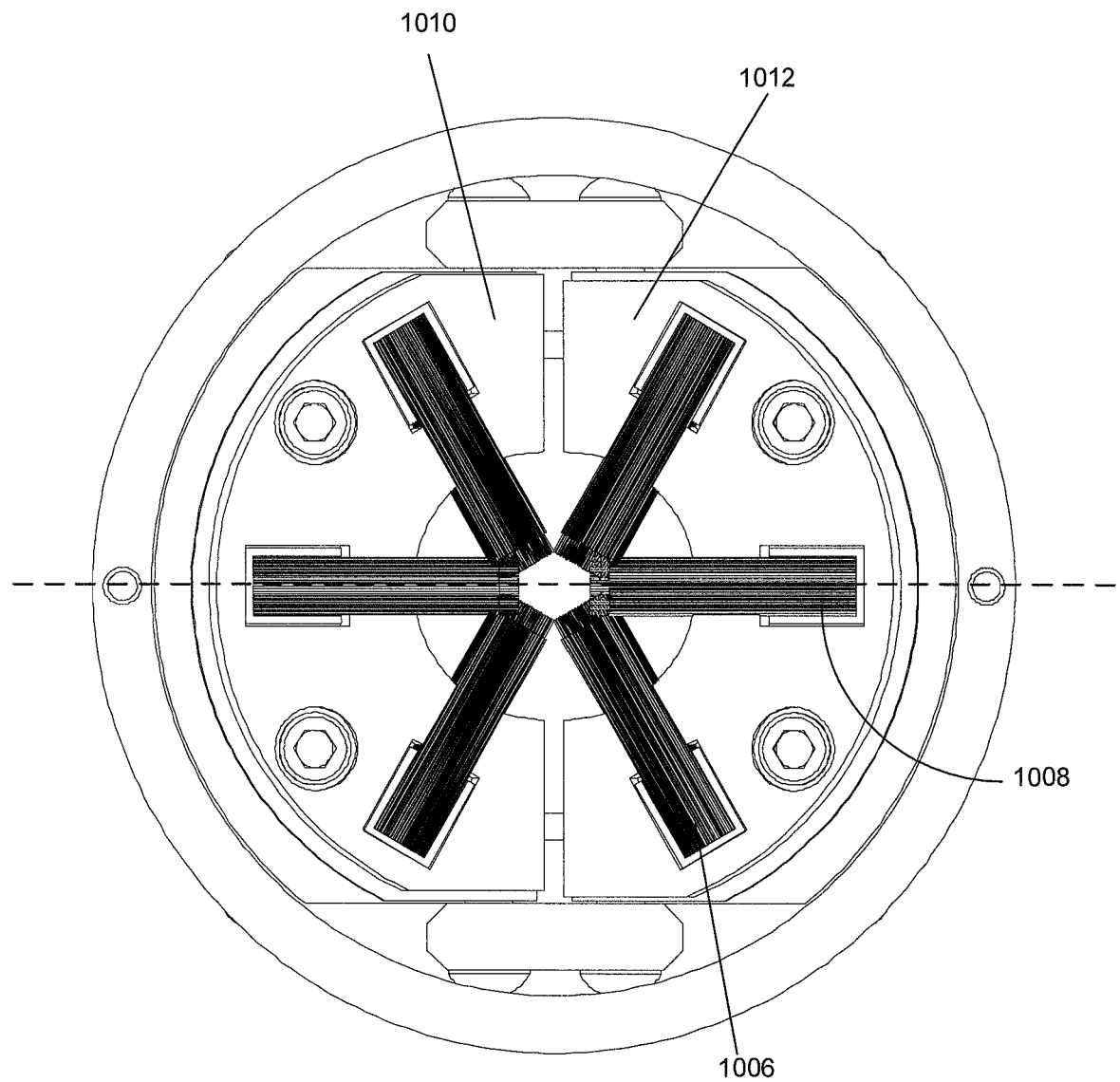
FIG. 11 is a top view of the tip and retaining head cleaning module of FIG. 10.

FIG. 11 is a top view of an example of the tip and retaining head cleaning module 400, including a tip and retaining head cleaning means 1006, for example, a brush, a grinder, milling tool, or a reamer. The retaining head cleaning means 1006 may comprise a plurality of brushes 1008. In the illustrated example, the brushes 1008 are arranged on the interior surfaces of a pair of brush support frames 1010, 1012. The brushes 1008 extend radially inwardly to a distance to engage the retaining head 110 and the tip 106.

Figure 12:
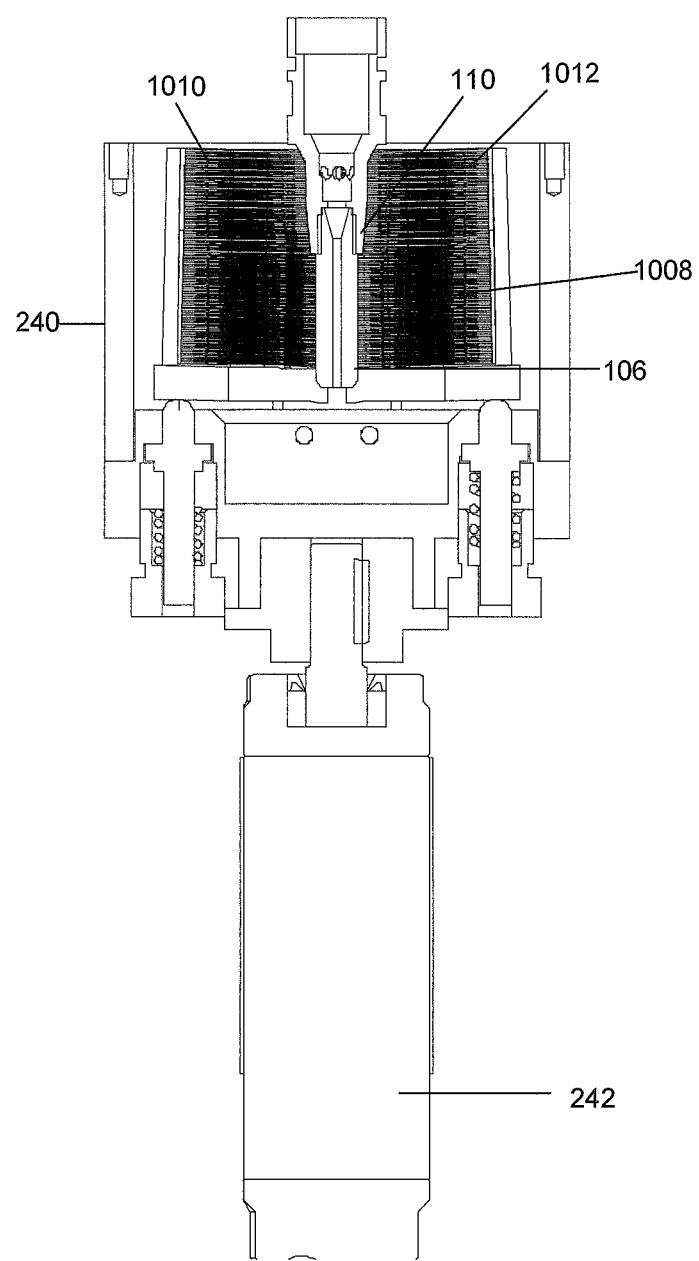
FIG. 12 is a sectional view of the tip and retaining head cleaning module of FIG. 10.

FIG. 12 is a sectional view of the tip and retaining head cleaning module 400. In operation, the retaining head 110 and the welding tip 106 may be fixed at a three-dimensional reference point. The tip and retaining head cleaning assembly 240 is caused to rotate, for example via air inlets 1002, 1004. The brushes 1008 together with outside housing of the tip and retaining head cleaning assembly 240 rotates about the axis defined by the retaining head 110 and the welding tip 106. The relative movement between the brushes 1008 and the welding tip or retaining head dislocates spatters accumulated around the welding tip or retaining head, particularly around the holes 112 of the retaining head 110.

Figure 13:
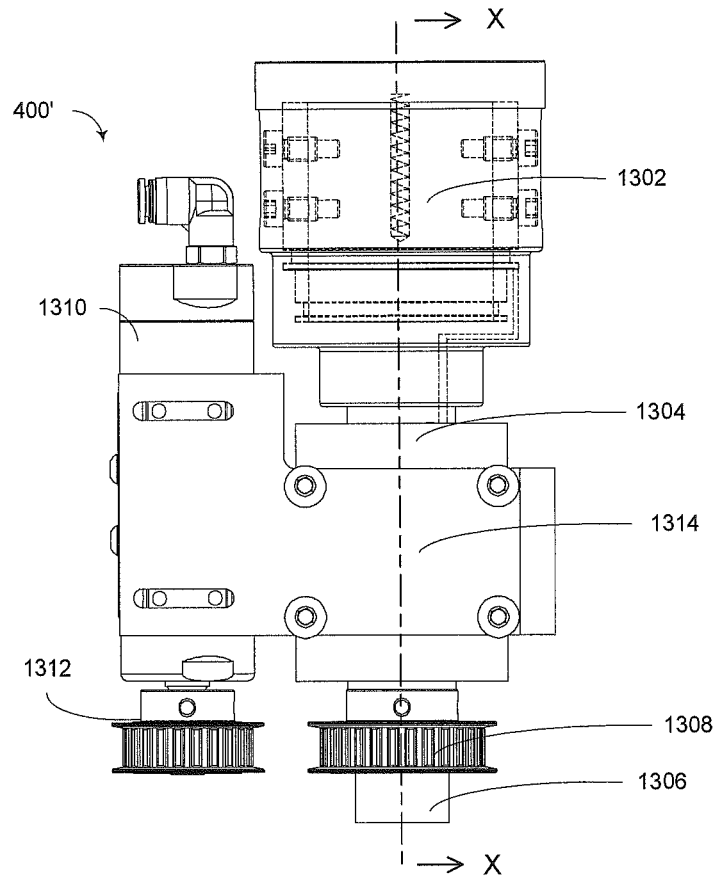
FIG. 13(a) shows another example of the tip and retaining head cleaning module.
FIG. 13(b) is a top perspective view of the tip and retaining head cleaning module of FIG. 13(a)
FIGS. 13(c), 13(d), 13(e) and 13(f) are sectional views of the tip and retaining head cleaning module of FIG. 13(a)
Figure 13:
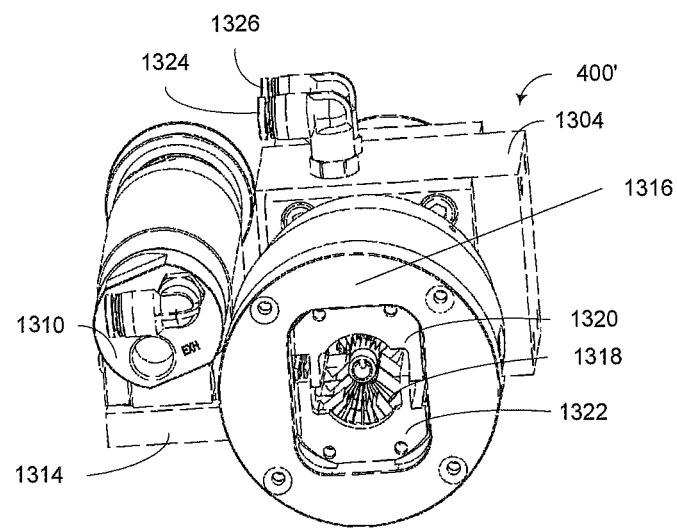
Figure 13:
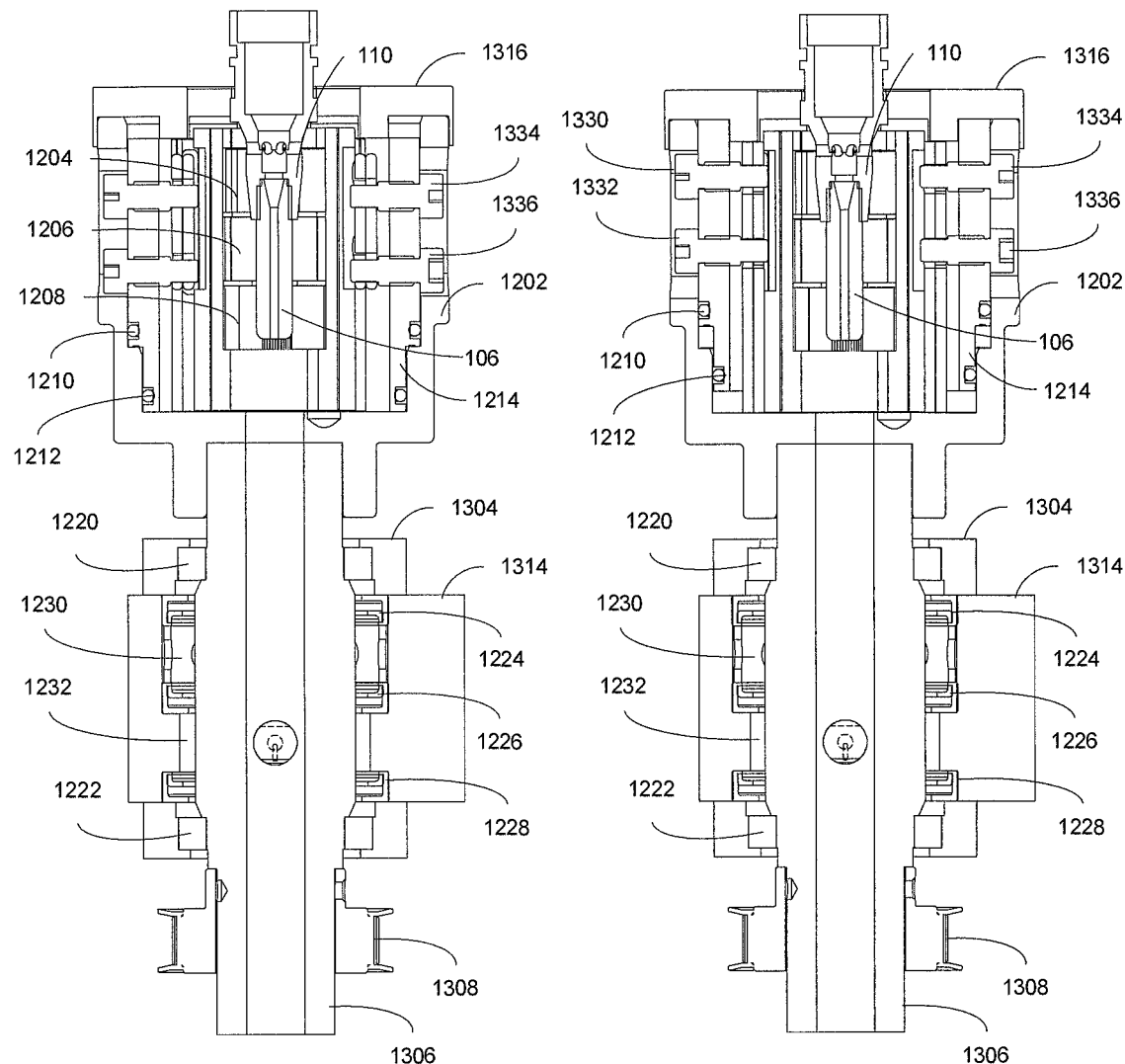

FIGS. 13-14 illustrate another example of the tip and retaining head cleaning module, indicated as 400'. The tip and retaining head cleaning module 400' includes a tip and retaining head cleaning assembly 1302, a vacuum assembly 1304, and a hollow shaft 1306. A pulley 1308 is provided on the hollow shaft 1306 and may be driven by a rotary pneumatic motor 1310, through a second pulley 1312 attached to the rotary pneumatic motor 1310 and a belt (not shown). The rotary pneumatic motor 1310 and the vacuum assembly 1304 are mounted on a back plate 1314.

FIG. 13(b) is a top perspective view of the tip and retaining head cleaning module 400'. A top cap 1316 encloses the tip and retaining head cleaning means, for example a brush, a reamer, a grinder, or a milling means. The tip and retaining head cleaning means may comprise a plurality of brushes 1318. In the illustrated example, the brushes 1318 are arranged on the interior surfaces of a pair of brush support frames 1320, 1322. The brush support frames 1320, 1322 carrying the brushes 1318 may be extendable to engage the retaining head 110 and the welding tip 106 with different diameters. Pneumatic pressure is provided to two air inlets 1324, 1326, one air inlet for generating a low pressure region inside the hollow shaft 1306, and the other air inlet for causing the movement of the brush support frames 1320, 1322.

FIGS. 13(*c*) and 13(*d*) are sectional views, taken by lines X-X in FIG. 13(*a*), of the tip and retaining head cleaning module 400'. The retaining head 110 and the welding tip 106 may be fixed at a single three-dimensional reference point. As depicted in FIGS. 13(*c*) and 13(*d*), the brushes may be provided in three groups 1204, 1206, 1208 along the axis defined by the retaining head 110 and the welding tip 106 so that the distance between the blades of group 1204 is slightly larger than that of groups 1206, 1208. The tip and retaining head cleaning module 400' includes an outside housing 1202. Inside the housing 1202 and arranged in sealed relationship through o-rings 1210, 1212 is a piston 1214. The piston 1214 is biased towards the bottom of the outside housing 1202 by a resilient means, for example, a spring 1216. The hollow shaft 1306 may be caused to rotate, for example as illustrated in FIG. 13(*a*), by a rotary pneumatic motor 1310, the pulleys 1308 and 1312 and a timing belt (not shown). The hollow shaft 1306 causes the outside housing 1202 and the brushes 1204, 1206, 1208 to rotate about the axis defined by the retaining head 110 and the welding tip 106.

The hollow shaft 1306 is supported by two bearings 1220, 1222 of the vacuum assembly 1304. Three seals 1224, 1226, 1228 are provided between the hollow shaft 1306 and the vacuum assembly 1304. When pneumatic pressure is applied to the inlets 1324, 1326, two ring-shaped air pockets 1230, 1232 may be formed around the hollow shaft 1306. In the illustrated embodiment, the inlet 1324 is in pneumatic communication with the air pocket 1230. Through an air duct (not shown) in the hollow shaft 1306, the air pocket 1230 is also in pneumatic communication with the outside housing 1202. Referring to FIG. 13(*d*), when pneumatic pressure is applied to the inlet 1324, the pressure in the ring-shaped air pocket 1230 around the shaft 1306 is transferred to piston 1214. The piston 1214 is urged to move upwards, as will be described below, the brush support frames 1106, 1108 are caused to move radially inwardly so that the brushes 1204, 1206, 1208 engage the retaining head 110 and the welding tip 106.

The air outlet 1234 is in pneumatic communication with the second inlet 1326. When pneumatic pressure is applied to the air inlet 1326, the pressure in the ring-shaped air pocket 1232 around the shaft 1306 causes the air to enter the air outlet 1234, resulting in a venturi effect thereby creating a low pressure region inside the hollow shaft 1306. The low pressure will vacuum the spatter dislocated from the retaining head 110 and/or the welding tip 106 through the bore of the hollow shaft 1306.

FIGS. 13(*e*) and 13(*f*) are sectional views, taken by lines Y-Y in FIG. 13(*c*) of the tip and retaining head cleaning module 400'. FIGS. 13(*e*) and 13(*f*) correspond to FIGS. 13(*c*) and 13(*d*), respectively.

In FIGS. 13(*e*) and 13(*f*), two pairs of pins 1330, 1332, 1334, 1336 are positioned on opposite sides of the piston 1214. As the piston 1214 is urged upwards by pneumatic pressure, the pins 1330, 1332, 1334, 1336 are also lifted in FIG. 13(*f*).

FIG. 14(*a*) shows the relative position of the brush support frames 1320, 1322 when the pins 1330, 1332, 1334, 1336 are in a lower position, i.e. when the piston 1214 is urged downwards by the springs 1216; while FIG. 14(*b*) shows the relative position of the brush support frames 1320, 1322 when the pins 1330, 1332, 1334, 1336 are in an elevated position, i.e. when the piston 1214 is urged upwards by the pneumatic pressure supplied through the inlet 1324.

The support frame 1320 has four angled slots, two of them being depicted in FIG. 14(*a*) as slots 1402, 1404, and the support frame 1322 also has four angled slots, two of them being depicted in FIG. 14(*a*) as slots 1406, 1408. As illustrated in FIG. 14(*a*), when the piston is in the lower position, the pin 1330 is at the bottom of a V-shape slot collectively formed by the angled slots 1402 and 1404; likewise the pin 1332 is at the bottom of the V-shape slot collectively formed by the angled slots 1404 and 1408.

The pins 1330, 1332 are slidable in guided relations along the confines of the angled slots 1402, 1406, 1404, 1408. When the pins 1330, 1332 are urged upwards by the pneumatic pressure, the top ends of the V-shapes are caused to move closer, resulting in the support frame 1320, 1322 moving together as illustrated in FIG. 14(*b*).

Figure 15:
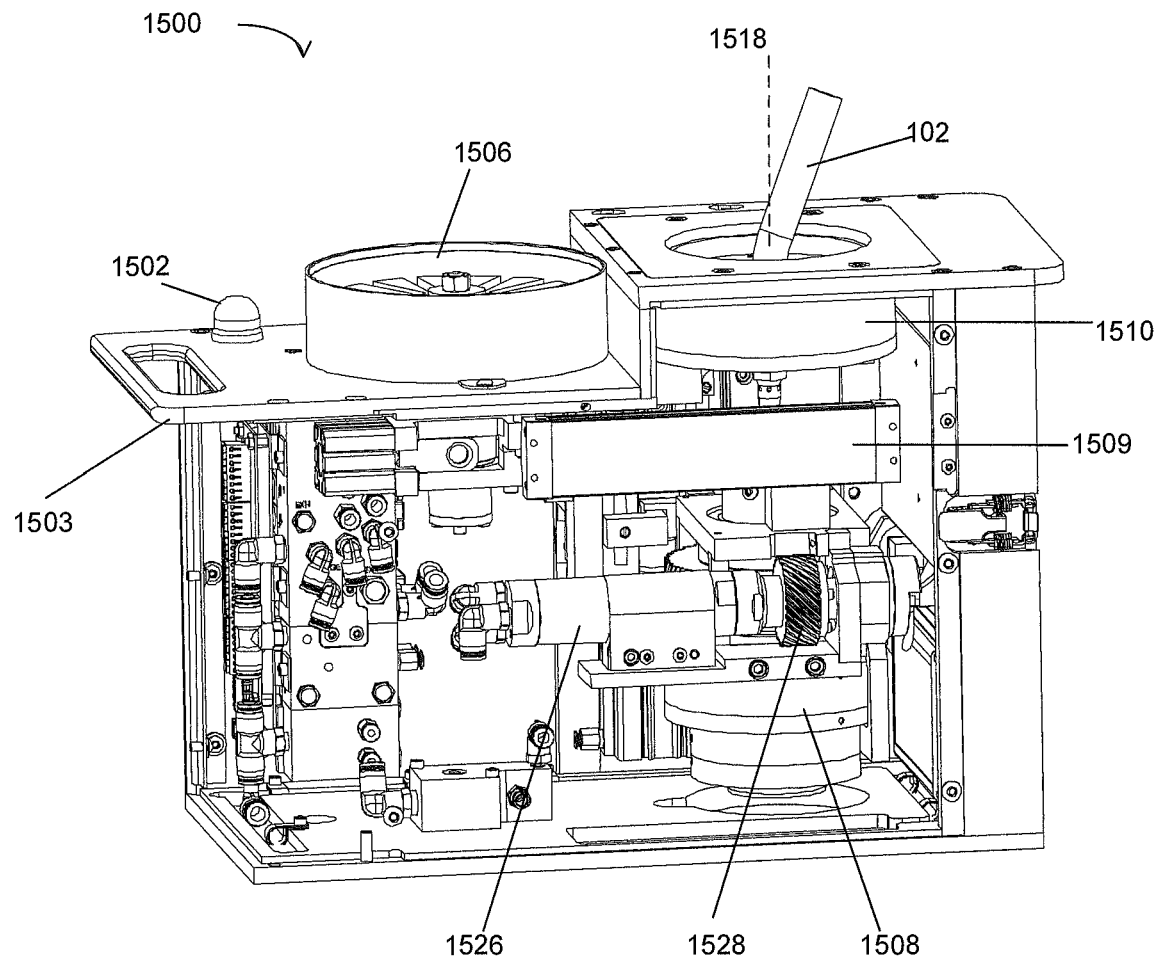
FIG. 15 is a perspective view of a welding tip changing apparatus.
Figure 16:
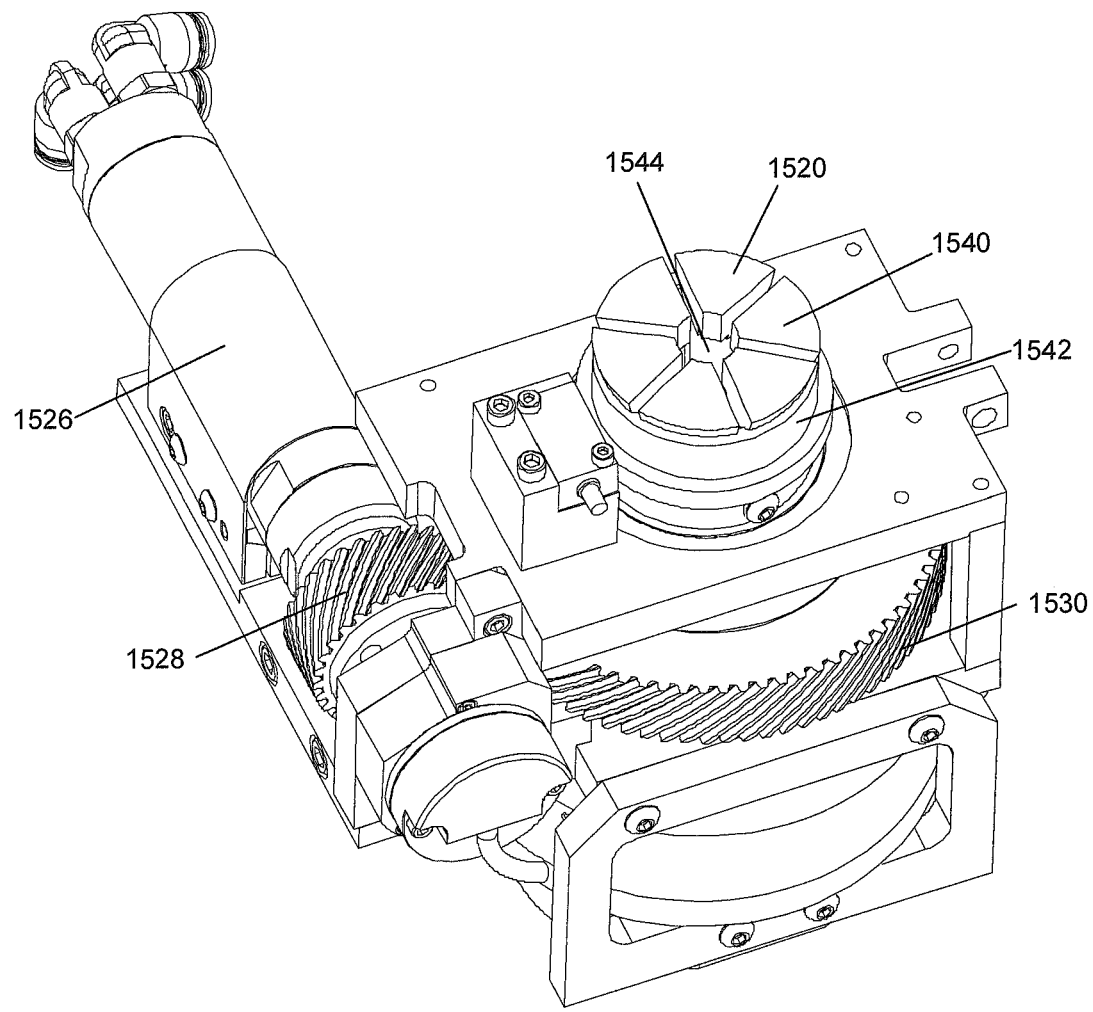
FIG. 16(a) is a top perspective view of the welding tip changing system of the welding tip changing apparatus when a second clamp is in an open position.
FIG. 16(b) is a top perspective view of the welding tip changing system when the second clamp is in a closed position.
Figure 16:
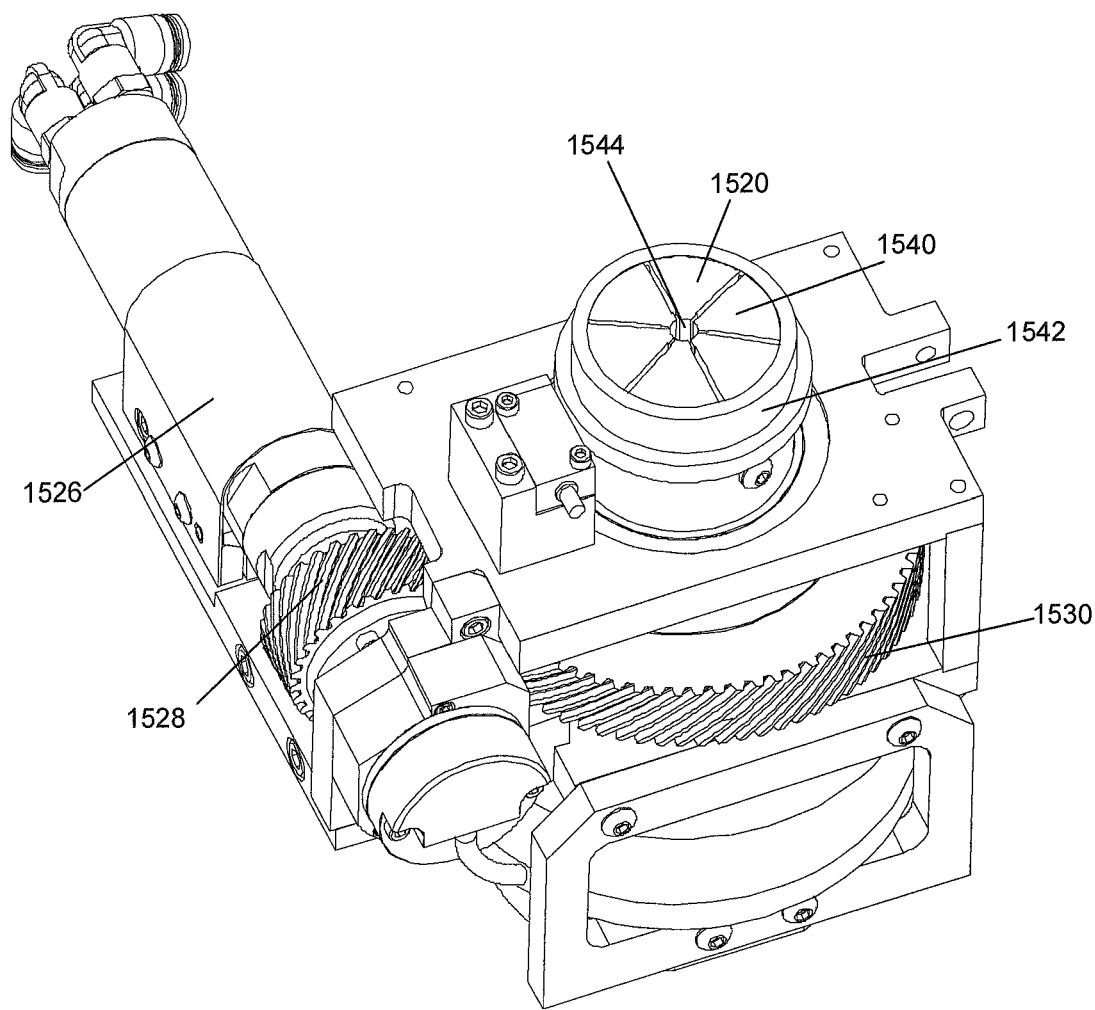

FIG. 15 illustrates one example of the welding tip changing apparatus 1500. In this depicted example, the welding tip changing apparatus 1500 is formed as an apparatus separate from the welding torch maintenance apparatus 200. It will be apparent to a person skilled in the art that the welding tip changing apparatus 1500 and the welding torch maintenance apparatus 200 of FIGS. 2-3 may be formed within a single enclosure.

Welding tips 106 wear after a certain period of use and may be unacceptable for continued use due to their construction. The time period to replace welding tips 106 may be based on the time the welding torch 102 is in use, or the amount of welding wire which has been fed through the welding tip 106. Following the removal of the nozzle 108 and the cleaning of the retaining head 110 and/or the welding tip 106 at the welding torch maintenance apparatus 200, the robotic arm carrying the welding torch 102 may be positioned to a welding tip changing apparatus 1500, where the welding tip 106 can be removed and replaced.

In the illustrated example, the welding tip changing apparatus 1500 includes a welding tip changing system 1508 for removing a used welding tip and attaching a new or replacement welding tip. The welding tip changing apparatus may also include a welding tip magazine 1506 for storing new or replacement welding tips.

In the illustrated example, the welding tip changing system 1508 is within the enclosure 1503 and the welding tip magazine 1506 is affixed to the enclosure 1503. The welding tip changing apparatus 1500 may include valve banks for controlling the operations of the various pneumatic drive means and/or include a status light 1502 on the enclosure 1503 to indicate its operation status.

Figure 17:
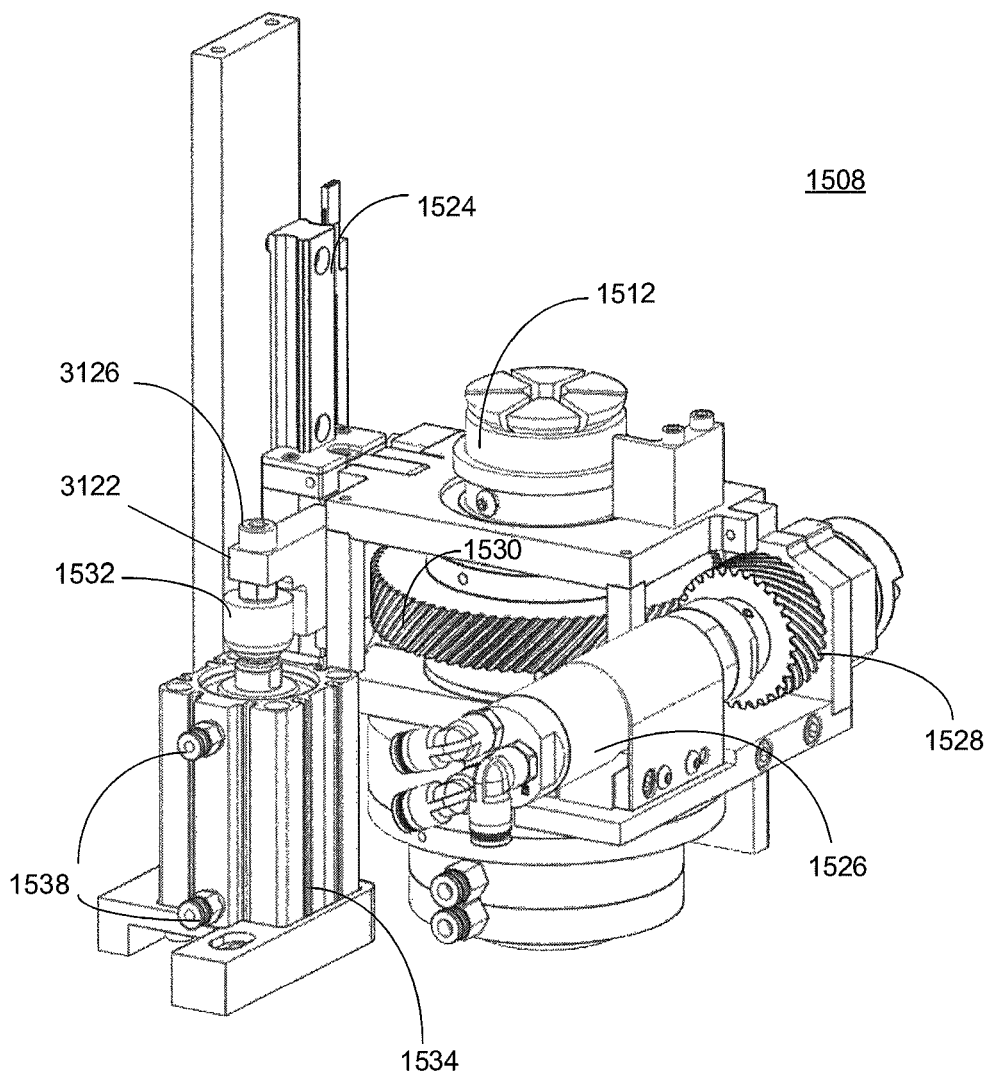
FIG. 17 is a perspective view of an example of the welding tip changing system.

The welding tip changing system 1508 includes a first clamp 1510 and a second clamp 1512 (shown in FIG. 17). The first clamp 1510 is adapted to receive and secure the welding torch 102. In this example the first clamp 1510 receives and secures the welding torch 102 by the retaining head 110 of the welding torch. The first clamp 1510 may include a plurality of moveable, cooperative gripping inserts, for example, jaws of a collet, to receive and secure the retaining head 110 in a releasably clamped relation therebetween. In the example, the gripping inserts are in an equidistantly spaced relation around a rotational axis 1518 and centers the welding tip 106 and/or the tip retaining head 110 of the welding torch 102 with respect to the rotational axis 1518.

The second clamp 1512 is provided for holding the welding tip 106 and may have a similar or identical structure as the first clamp 1510. In one exemplary implementation, the second clamp 1512 is a collet comprising a plurality of jaws arranged in an equidistantly spaced relation around a central axis which is aligned with the rotational axis 1518, for clamping the welding tip 106. The second clamp 1512 is movable between a closing position, in which gripping inserts are extended to clamp and hold the welding tip 106, and a retracted and open position wherein gripping inserts are positioned out of the closing relation. The second clamp 1512 is further adapted to rotate about and move along the rotational axis 1518, as will be described below.

In the drawings one example of the configuration of each of the first and the second clamps 1510, 1512 is shown for illustration purpose only. Other implementations for the first clamp 1510 or the second clamp 1512 are readily available, for example, other pneumatically, hydraulically, mechanically, magnetically, or electrically controlled clamps, for holding the retaining head 110 and the welding tip 106.

In operation, the second clamp 1512 holds the welding tip 106 and rotates about the rotational axis 1518 to remove the welding tip 106. The rotation of the second clamp 1512 may start prior to the second clamp 1512 moving into the closing position. As the second clamp 1512 holds and removes the welding tip 106, the second clamp 1512 may be actuated vertically to detach the welding tip 106 from the welding torch 102.

FIGS. 16(a) and 16(b) provide one exemplary implementation of the second clamp 1512, in the form of a collet 1520. FIG. 16(a) illustrates the collet 1520 in an open position where the matching taper 1542 has moved downwardly and the plurality of jaws 1540 have moved radially outwardly to enlarge the diameter of the opening 1544. In comparison, FIG. 16(b) illustrates the collet 1520 in a closed, clamping position where the matching taper 1542 has moved upwardly and the plurality of jaws 1540 have moved radially inwardly with respect to the matching taper to reduce the diameter of the opening 1544. The jaws 1540 of the collet 1520 generally transition from the open position to the closed position, when a used tip is delivered to the welding tip changing apparatus by a robot or other means to secure the tip for removal. The jaws 1540 of the collet 1520 generally transition from the closed position to the open position, when the used welding tip 106 is removed from the welding torch 102, at which time the welding tip 106 is released from the collet 1520, either dropped through the hollow space below the collet 1520 or removed by other means. The jaws 1540 of the collet 1520 generally transition from the open position to the closed position, when a new tip is delivered from the welding tip magazine 1506 to be attached to the welding torch 102. The jaws 1540 of the collet 1520 generally transition from the closing position to the open position when the new welding tip 106 is fastened to the welding torch 102.

FIG. 17 illustrates one example of the welding tip changing system 1508. The welding tip changing system 1508 includes a drive means for rotating the second clamp 1512. In the illustrated example, the drive means includes a horizontal rotary pneumatic motor 1526 and a horizontal helical gear 1530 and a connecting small helical gear 1528. The horizontal helical gear 1530 is connected to the second clamp 1512 so that the horizontal helical gear 1530 and the second clamp 1512 rotate about the rotational axis 1518 when driven by the smaller helical gear 1528 connected to the horizontal rotary pneumatic motor 1526. The welding tip changing apparatus 1500 may include a means for measuring rotational motion of the second clamp 1512. It will be apparent to a person skilled in the art that other implementations are readily available, for example, other pneumatic, hydraulic, mechanical, magnetic, or electrical motor arrangements. Similar to the nozzle removal system 300, the second clamp 1512 may be in pneumatic communication with an air distribution assembly which operates to open and close the second clamp 1512.

The welding tip changing system 1508 includes a lift system for moving the second clamp 1512 along the rotational axis 1518. In the illustrated example the lift system is a pneumatic float system including a cylinder 1534. The system may include a control device for controlling and coordinating various operations of system's components, and the control device may be configured to control air pressure or air volume in the cylinder 1534 and/or to control a position of the cylinder 1534. The cylinder 1534 may be operated with a dump and fill manifold (see e.g., FIG. 27). The lift system may include movement detecting means to control the cylinder movement. For example, the movement detecting means may include potentiometers. It will be apparent to a person skilled in the art that other implementations are readily available, for example, rotary encoder, rotary potentiometer, rack and pinion, proximity sensors.

The welding tip changing system 1508 includes a carriage (see e.g., 1522 of FIG. 31) that moves along a vertical rail 1524. In the illustrated example, the carriage secures and moves the second clamp 1512, the horizontal rotary pneumatic motor 1526 and the helical gears 1528, 1530. The carriage is attached to an alignment joint or floating connector 1532 of the cylinder 1534 and moves vertically when the cylinder 1534 is driven pneumatically via air inlets 1538. When actuated, the cylinder 1534 carrying the carriage, together with the second clamp 1512, the horizontal rotary pneumatic motor 1526 and the helical gears 1528, 1530, moves in the vertical direction.

Preferably, the rail 1524 is mounted to a rigid structure, for example, a frame member of the welding tip changing apparatus 1500. The rail 1524 provides the directional guidance so that the second clamp 1512, the rotary pneumatic motor 1526 and the helical gears 1528, 1530 moves in the vertical direction, when driven through the cylinder 1534.

In the case of a threaded tip, the welding tip changing system 1508 provides a degree of movement freedom in the vertical direction which compensates a potential slight offset between the thread pitch of the welding tip 106 and the retaining head 110. Such a degree of freedom also provides a buffer to accommodate the rotational speed and lift rate of the second clamp 1512. As will be apparent to a person skilled in the art, the threads may likely not be aligned at the beginning of the process.

Figure 18:
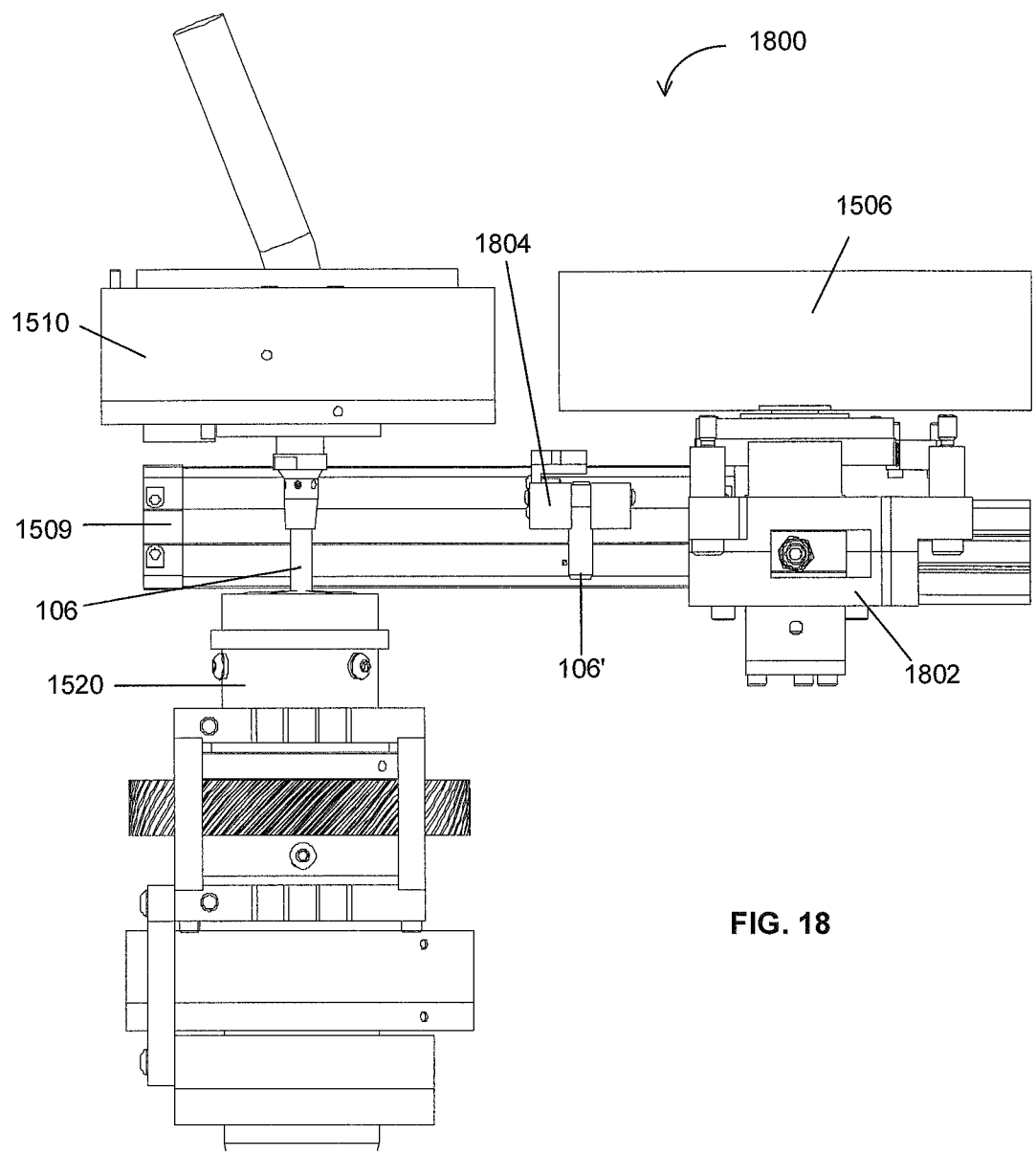
FIG. 18 is a sectional view of a tip feeder assembly.

FIG. 18 shows an exemplary tip feeder assembly 1800. The tip feeder assembly 1800 comprises the welding tip magazine 1506 for storing new or replacement welding tips, a tip feeder 1802 delivers a new welding tip 106' to a tip holder (not shown) from the welding tip magazine 1506, and a tip gripper 1804 which holds and transports the new welding tip 106' to a gripping means, for example, the second clamp 1512. The tip gripper 1804 may be moved by a pneumatic rodless cylinder 1509 between the welding tip magazine 1506 and the second clamp 1512. The welding tip magazine 1506 holds a number of new tips in standing position. A new welding tip 106' is fed one at a time to the tip gripper 1804 and the tip gripper 1804 transfers the new welding tip 106' to the welding tip changing system 1508.

Figure 19:
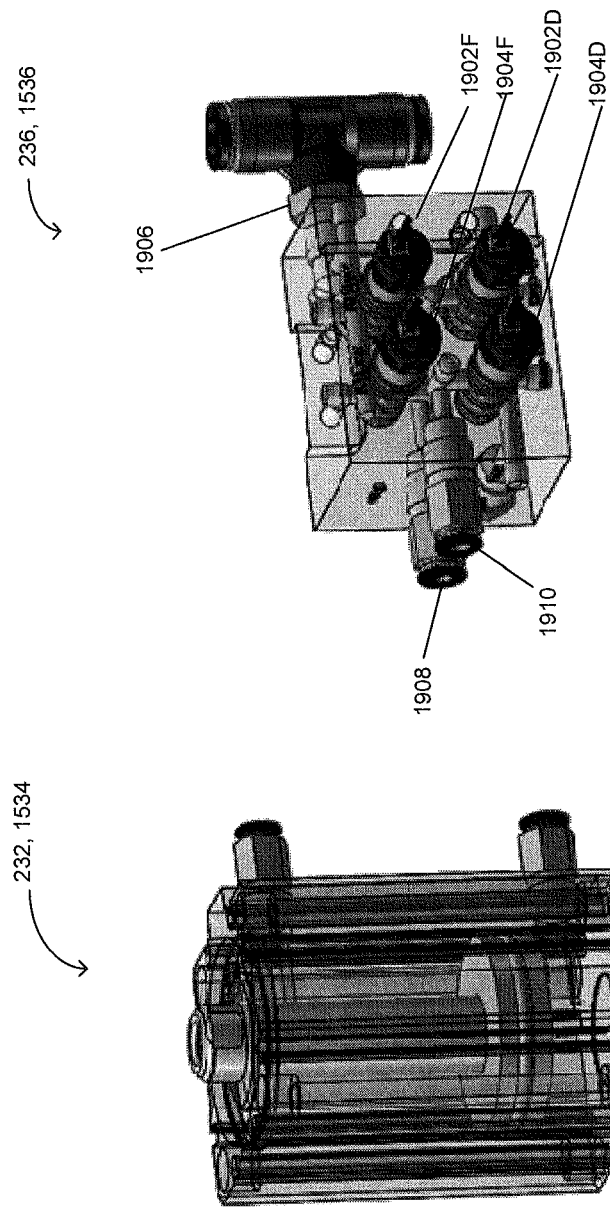
FIG. 19(a) is a perspective see-through view of one example of a cylinder.
FIG. 19(b) is a perspective see-through view of one example of a dump and fill manifold.

FIG. 19(*a*) is a see-through view of one example of the cylinder 232, 1534 used in the lift system of the nozzle removal system 300 and the lift system of the welding tip changing system 1508. FIG. 19(*b*) is a see-through view of one example of a dump and fill manifold 236, 1536. The cylinder 232, 1534 may be used in connection with the dump and fill manifold 236, 1536. The dump and fill manifold 236, 1536 includes two valves 1902D, 1902F in pneumatic communication with the upper chamber of the cylinder 232,1534, and two valves 1904D, 1904F in pneumatic communication with the lower chamber of the cylinder 232,1534, one of the two upper/lower valves 1902D, 1904D being a dump valve and the other one of the two upper/lower valves 1902F, 1904F being a fill valve. A main air line 1906 feeds both upper and lower fill valves 1902F, 1904F. Upper dump valve 1902D is linked to an upper exhaust port (not shown), while lower dump valve 1904D is linked a lower exhaust port (not shown). The pneumatic control line 1908 is linked to both upper dump valve 1902D and upper fill valve 1902F; and pneumatic control line 1910 is linked to both lower dump valve 1904D and lower fill valve 1904F. For each air inlet 234, 1538 of the cylinder 232, 1534, air can travel both ways. When the piston in the cylinder 232, 1534 is to be actuated, both fill valves 1902F, 1904F are modulated to add air into their pneumatically connected chambers and both dump valves 1902D, 1904D are modulated to release air from their pneumatically connected chambers.

In the depicted example, two separate valves (i.e., dump valve and fill valve) are allocated to each of the upper chamber and the lower chamber of the cylinder 232, 1534. In another example, a single valve that acts as a dump valve and a fill valve may be provided to control each chamber of the cylinder. In a further example, a pressure regulating device for electronically or mechanically regulating inlet and outlet flow of the cylinder 232, 1534 may be used to regulate the operation of the cylinder 232, 1534.

In the example, the cylinder is a dual acting single rod cylinder. However, the configuration of the cylinder 232, 1534 is not limited to those shown in the drawings. The cylinder 232, 1534 may be a single chamber cylinder. The cylinder 232, 1534 may be a rodless cylinder. The cylinder 232, 1534 may be operated with a digital valve and/or an analog valve. The valve may be a proportional valve and/or a servo valve. The valve may be controlled using a solenoid. The valve may be electronically or magnetically operated. The valve may be controlled by a closed-loop circuit and/or by an open loop circuit.

Figure 20:
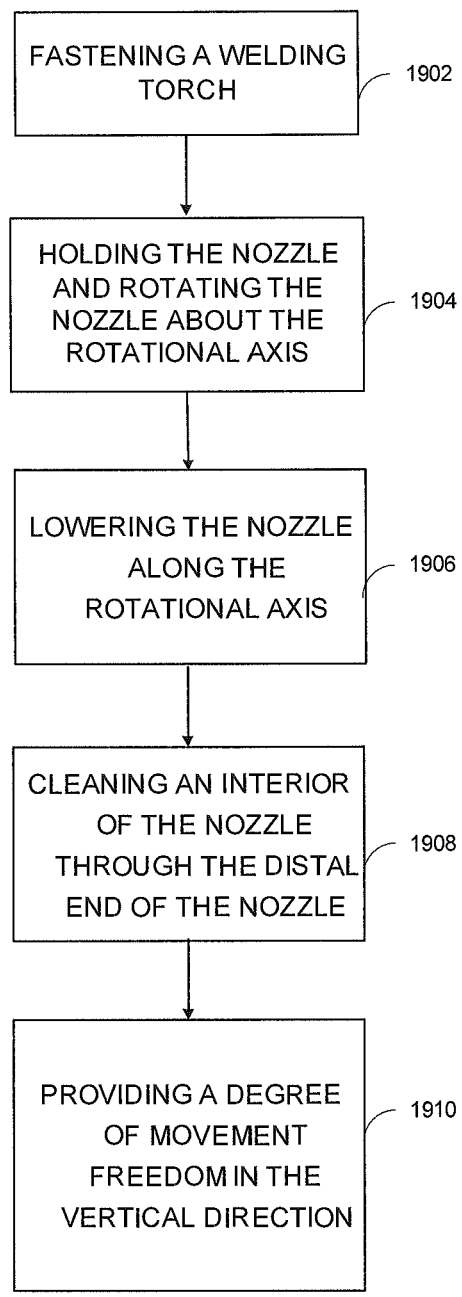
FIG. 20 is a flow chart showing one example of a method for removing and cleaning a nozzle.

FIG. 20 is a flow chart showing generally one example of a method for removing and cleaning the nozzle 108 of the welding torch 102. Prior to the operation, a robotic arm or other means may first move the welding torch 102 to the welding wire cutter 260 for clipping the end of the weld wire from the welding tip 106. At step 1902, the welding torch 102 may be lowered into aperture 206 of the first clamp 210, which is caused to secure and align the welding torch 102 in place. As a result, the welding torch 102 is secured and the nozzle 108 of the welding torch 102 is aligned with the rotational axis 201. At step 1904, the second clamp 212 transitions into the closing position to hold the nozzle 108 and may rotate about the axis 201 to remove the nozzle 108 from the welding torch 102. The rotation may be caused by the rotary pneumatic motor 214 through the helical gear 218 and preferably starts prior to the second clamp 212 moving into the closing position. Simultaneously or subsequently at step 1906, the lift system is actuated and the nozzle 108 is lowered vertically along the rotational axis 201 to detach from the welding torch 102. An interior of the nozzle 108 is then cleaned at step 1908, by for example, a brush, a reamer, high pressure air/fluid/spray, grinding, milling or other cleaning means 412 entering the nozzle 108 from the distal end 120. The nozzle 108 may continue to be rotated and/or actuated in the vertical direction along the axis 201. The cleaning means 412 may be static or rotary. The relative movement between the cleaning means 412 and the nozzle 108 dislocates spatter accumulated on interior surfaces of the nozzle 108. At this time, pneumatic pressure may be applied to the vacuum mode via air inlet 404 where the spatter dislocated from the nozzle 108 is removed and vacuumed down through the bore of the shaft.

After the nozzle 108 is detached from the welding torch 102, the robotic arm, or other means may lift the welding torch 102 out of the aperture 206 and into aperture 204 for cleaning of the welding tip 106 and/or retaining head 110. Prior to doing so, the wire may be cut for a second time to remove wire exposed during the process; alternatively, the exposed wire may be retracted to save operational time. The robotic arm may move the welding torch 102 up and down while the tip and retaining head cleaning means rotates. Alternatively, the tip and retaining head cleaning module may be moved up and down while rotating. Once the welding tip 106 and/or retaining head 110 is cleaned, it is easier for the welding tip 106 to be clamped for its removal and/or replacement.

As illustrated in step 1910, a degree of movement freedom is provided in the vertical direction for detaching or reattaching of the nozzle 108.

Figure 21:
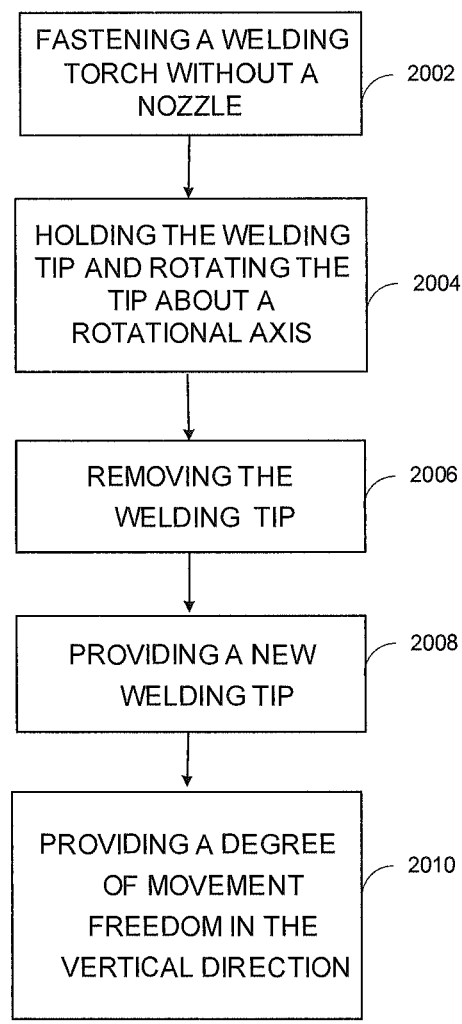
FIG. 21 is a flow chart showing one example of a method for removing and replacing a welding tip.

FIG. 21 is a flow chart showing generally one example of a method for removing and replacing a welding tip 106, according to an embodiment of the invention. After the nozzle 108 is removed from the welding torch 102, the robotic arm or other means may move the welding torch 102 to the welding tip changing apparatus 1500. At step 2002, the first clamp 1510 grips the welding torch 102 so that the welding tip 106 of the welding torch is in alignment with the rotational axis 1518. At this time, the second clamp 1512 may be in an open position. At step 2004, the second clamp 1512 closes to engage the welding tip 106 and rotates the welding tip 106 about the rotational axis 1518. The second clamp 1512 may be caused to rotate, preferably before the second clamp moves into the closing position. Simultaneously or subsequently the second clamp 1512 may be actuated vertically to remove the welding tip 106 from the welding torch 102, at step 2006. The first clamp 1510 then moves into the open position to release the welding torch 102, where the robotic arm or other means may lift the welding torch without the welding tip 106 attached. At this time an amount of wire may be exposed which is about the length of the welding tip 106. Such a portion of the wire can either be cut by the wire cutter 260 for a third time, or retracted to save operational time. The removed welding tip 106 is released or removed by any means from the welding tip changing apparatus 1500.

At step 2008, a new or replacement welding tip 106' is dispensed by the welding tip magazine 1506 into the tip holder (not shown). A tip gripper 1804 is mounted to a movable tip shuttle 1509 which may be implemented using a rodless pneumatic cylinder. The tip gripper 1804 attached to the tip shuttle 1509 may lie between the welding tip magazine 1506 and the tip holder. The newly dispensed replacement welding tip 106' can be held by the tip gripper 1804 to bring to a position which is in alignment with the rotational axis 1518. The tip shuttle 1509 is used to bring the tip gripper 1804 and replacement welding tip 106' from the tip holder, into alignment with the rotational axis 1518. A means for shuttling the new tip may be operated in a closed loop manner. It will be apparent to a person skilled in the art that other implementations are readily available, for example, other pneumatic, hydraulic, magnetic, mechanical or electrical tip shuttle arrangements. The welding tip changing system 1508 may then be actuated to move up to grab the new welding tip 106'. Once the second clamp 1512 securely holds the new welding tip 106', the tip gripper 1804 opens to release it. The welding tip changing system 1508 may be actuated to move downwards with the new welding tip 106' to detach it from the tip gripper 1804 and the tip gripper 1804 is sent back to the tip feeder 1802. For reattaching the welding tip 106', the welding torch 102 is lowered again into the welding tip changing apparatus 1500 to be secured by the first clamp 1510 and in alignment with the rotational axis 1518. The second clamp 1512 moves upwards while rotating to replace the new welding tip 106' to the welding torch 102. The replacing operation may not be completed in a single run; rather, the second clamp 1512 may be stopped at intervals for optimal attachment and to compensate for thread relaxation. As described above, the lift system acts to adjust the vertical movement, and thereby providing a degree of movement freedom in the vertical direction. Once the replacing operation is completed, the second clamp 1512 and the first clamp 1510 open and the robotic arm or other means carrying the welding torch 102 with the new welding tip attached is lifted out of the welding tip changing apparatus 1500. At this time a new welding tip may be provided to the tip holder (not shown) to prepare for a next replacement operation.

To place the cleaned nozzle 108 back on, the robotic arm or other means moves the welding torch 102 back to the nozzle removal system 300. Again, the welding torch 102 is clamped by the first clamp 210 for example at the goose neck 114. The cleaned nozzle 108 is clamped in place by the second clamp 212. In case of a threaded nozzle 108, the second clamp 212 will be actuated to rotate and move vertically to replace the cleaned nozzle 108 onto the collar 116 of the welding torch 102, similar to the threading operation of the new welding tip 106' described above. A degree of movement freedom is provided in the vertical direction by way of the float system. Optionally, vacuum mode may be turned on in case more weld spatter comes off during the process. Once the nozzle 108 is replaced to the welding torch 102, the first and second clamps 210, 212 are opened and the robotic arm or other means lifts the welding torch 102 with a new welding tip 106' and a cleaned nozzle 108, which can be recommissioned for welding operation.

As described above, the servicing of the welding torch 102 can be completed in a single run, by moving the welding torch between the nozzle removal system 300, the tip and retaining head cleaning module 400, and the welding tip changing system 1508. Alternatively, the various modules can be used separately for their individual functions.

The welding torch maintenance apparatus 200 may also include a user interface for diagnostic and/or programming purposes. The user interface for the welding torch maintenance apparatus 200 may include a simple membrane switch, a touch screen HMI, a more complex web-server, or other interface.

Figure 22:
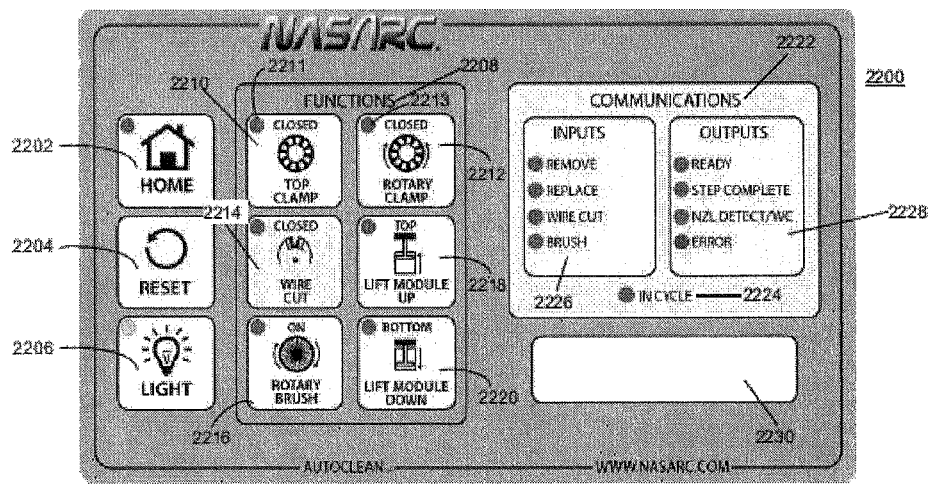
FIG. 22 is an exemplary simple membrane switch interface for the welding torch maintenance apparatus.

FIG. 22 illustrates one example of a simple membrane switch interface 2200 for the welding torch maintenance apparatus 200. The simple membrane switch interface 2200 is designed to be used as a simple user point of diagnostic and programming interface. The simple membrane switch interface 2200 may include a number of controls and provide feedback for the user to program the welding torch maintenance apparatus 200 to work with a robot or other means. As shown in FIG. 22, the simple membrane switch interface 2200 may include a "Home" button 2202 that sends the welding torch maintenance apparatus 200 to a known state where it is immediately ready to run a cycle, e.g., a nozzle clean cycle. The LED indicator associated with the "Home" button 2202 shows the user when the welding torch maintenance apparatus 200 is at the home position. The simple membrane switch interface 2200 may also include a "Reset" button 2204 that clears any active alarms on the welding torch maintenance apparatus 200 and sends the program to a user-controlled state before the alarms. A "Light" button 2206 may further be provided to turn on a LED light inside the welding torch maintenance apparatus 200 to allow the user to see more clearly inside the apparatus. The LED indicator associated with the "Light" button 2206 provides feedback to the user to indicate that the light has been turned on.

The simple membrane switch interface 2200 may also include a "Functions" area 2208, which include a number of controls as shown in FIG. 22. The "Top Clamp" button 2210 may allow the user to activate the first clamp 210 and see a sensor status/feedback through its LED indicator 2211. The "Rotary Clamp" button 2212 may allow the user to activate the second clamp 212 inside the apparatus 200, and see a sensor status/feedback through its LED indicator 2213. These two buttons can be helpful in determining when the central axis 201 of the nozzle removal system 300 is aligned with the central axis of the nozzle 108 of the welding torch 102. A "Wire Cut" button 2214 and a "Rotary Brush" button 2216 allow the user to control the welding wire cutter 260 and the tip and retaining head cleaning means 400 respectively, to ensure correct operations, and/or to validate their robot's programming points. A "Lift Module Up" button 2218 and a "Lift Module Down" button 2220 allow the user to send the nozzle removal system 300, in the corresponding directions. Their corresponding LED indicators show when the system 300 is near these respective positions.

The simple membrane switch interface 2200 may further include a "Communications" area 2222 which includes a number of LED indicators for indicating the status of the inputs and outputs of the apparatus 200 in communication with the robot or other means to the user. An "In Cycle" LED indicator 2224 is active any time a cycle is in progress. The other LED indicators may show the status of inputs 2226 coming to the welding torch maintenance apparatus 200 from the robot or other means, and the status of outputs 2228 going from the welding torch maintenance apparatus 200 to the robot or other means. These LED indicators 2226, 2228 may show the status of any discrete and/or networked inputs and outputs. The simple membrane switch interface 2200 may include an LCD display for indicating the current internet protocol (IP) address of the welding torch maintenance apparatus 200, as well as any active alarms. In FIG. 22, the LCD display is shown as the white box 2230 under the "Communications" area 2222 which may be a transparent pane that covers a green, backlit LCD display. If there are no active alarms, the LCD display 2230 may display the IP address at all times. If there are active alarms, the display 2230 may toggle through the different alarms as well as the IP address. The IP address shown can be used to facilitate integration with an automation controller such as a PLC/PAC and/or troubleshooting through the web-server user interface.

The simple membrane switch interface 2200 may be controlled by a printed circuit board (PCB) mounted inside the enclosure 202. The LCD display 2230 may be mounted on and controlled by this PCB as well, and is visible through a cut-out on the enclosure 202. The PCB may also communicate with the main controller of the welding torch maintenance apparatus 200.

In addition to the simple membrane switch interface 2200, a web-server may be provided to each welding torch maintenance apparatus 200 for giving the user access to more data than is available on the simple membrane switch 2200. The web-server may also grant the welding torch maintenance apparatus 200 remote accessibility. The web-server may be hosted on an integrated circuit (IC) that may be additionally responsible for industrial networking.

There are several information and/or pages that may be made available on the web-server. An "Info" button may be provided that reveals the current software versions being run by the main controller, and the controller of the simple membrane switch interface 2200. A "Help" button may also be provided for displaying a concise, navigable troubleshooting guide for common issues.

Some other information may be provided by the web-server and may be made navigable through a tab control. Such information may include:

- An "Overview" page for displaying the current status of any cycle that is currently in progress. A table with all the analog sensor data and alarm counts may also be included;
- A "Diagnostic" page for giving the user controls to activate all of the outputs in the welding torch maintenance apparatus 200, and to activate the LEDs representing all of the inputs in the apparatus. Additionally, an option may be provided to override any of the sensors in the apparatus to verify correct operation. Another set of controls may be provided to give the user the ability to step through a nozzle clean cycle to validate that each step of the process is completed successfully. A table may be provided to show the user what steps have been completed as the user steps through the cycle;
- An "Options" page for giving the user access to some of the operation and configuration parameters of the welding torch maintenance apparatus 200; and
- An "Interface" page for giving the user the ability to view the status of the discrete and/or networked inputs and outputs, override the welding torch maintenance apparatus 200's default I/O setup, simulate sending outputs to the robot or other automation controller, simulate how the welding torch maintenance apparatus 200 will respond to inputs from the robot or other automation controller, safely test the communication control between the apparatus and the robot or other automation controller, and/or allow the user to reset alarms, reboot the main controller, and restore the controller of the apparatus to its default settings.

The welding tip changing apparatus 1500 may include a user interface for diagnostic and/or programming purposes. The user interface for the welding tip changing apparatus 1500 may include a simple membrane switch and a more complex web-server. The user interface for the welding tip changing apparatus 1500 may be similar to the user interface for the welding torch maintenance apparatus 200 described above, or may be differently designed, based on the user preference.

Figure 23:
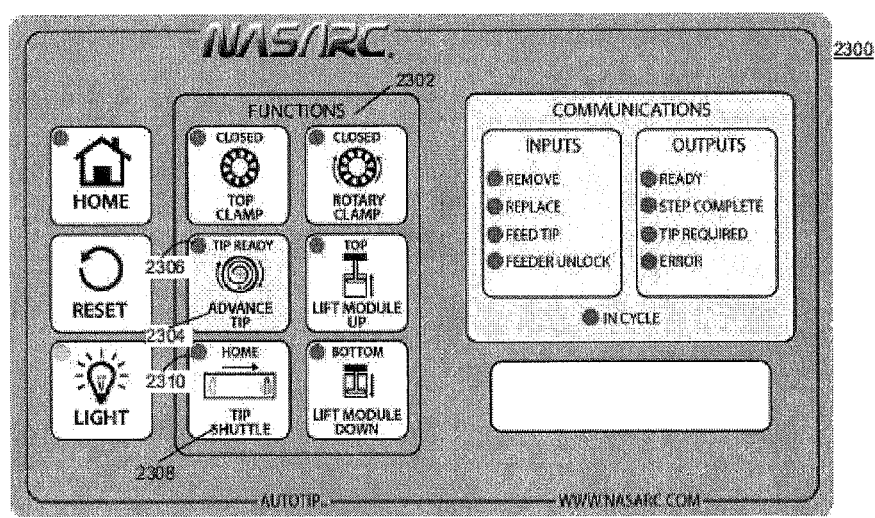
FIG. 23 is an exemplary simple membrane switch interface for the welding tip changing apparatus.

FIG. 23 illustrates one example of a simple membrane switch interface 2300 for the welding tip changing apparatus 1500. The switch interface 2300 includes a number of buttons similar to those on the switch interface 2200, provided for similar operations. An "Advance Tip" button 2304 may be provided in the "Functions" area 2302 and is used to feed a new tip 106' from the welding tip magazine 1506 to the tip holder (not shown) where it will be available to be installed during the next cycle. A "Tip Ready" LED indicator 2306 above the button 2304 indicates whether or not a tip is presently sitting in the tip holder (not shown). A "Tip Shuttle" button 2308 may be provided which will bring the tip gripper 1804 (attached to the rodless cylinder 1509) to the tip holder position. The "Home" LED indicator 2310 above the button 2308 indicates when the tip gripper 1804 is at the tip holder position.

In addition to the simple membrane switch interface 2300, a web-server may also be provided to each welding tip changing apparatus 1500 for giving the user access to more data than is available on the simple membrane switch 2300. For all intents and purposes, the description outlined for the web-server functionality of the welding torch maintenance apparatus 200 can be used for the web-server of the welding tip changing apparatus 1500. While there are different devices within the welding tip changing apparatus 1500, and a few different configuration parameters, it will be apparent to persons skilled in the art that the web-server functionality of the welding torch maintenance apparatus 200 can be adapted to apply to the welding tip changing apparatus 1500.

While the user interface for the welding torch maintenance apparatus and that for the welding tip changing apparatus are described with reference to specific layouts of the buttons and displays, it will be apparent to a person skilled in the art that different layouts may be used, and a number of other buttons, panels and/or information may be included in the user interface for similar or other diagnostic and programming purposes, depending on the features desired by the user.

A float system for force and/or position control in respect to welding nozzles and/or contact tips is described in detail. There may exist several different methods for securing the gas nozzle 108 to the welding torch 102, screw-on (threads), a push-on friction hold, a bayonet-lock, or other which may be employed in the nozzle removal system 300. In each method, the amount of force applied between these components and/or a relative position between the components is controlled to prevent damage to the components while maintaining a secure connection and correct machine operation. Similarly, the amount of force between components and/or a relative position between the components is controlled for the welding tip changing system 1508 to prevent damage to the threads when making contact between the mating objects. A damaged thread where the thread begins greatly increases the risk of cross-threading. In addition, for threaded fastening of either the gas nozzle 108 or contact tip 106, when threading or unthreading these components, the rate of linear motion relative to the rate of rotational motion is controlled to match the lead length of the thread. If this is not the case, the threads may self-lock when it is undesirable due to excessive forces between the threaded objects. By controlling the amount of force exerted between threaded objects and/or controlling a position between objects, this problem is eliminated. The float system described herein is configured to compensate for any mismatch between linear motion and rotational motion of the mating objects, or reduce/control the applied force between the objects in an open loop manner or a closed loop manner.

In one example, the float system is implemented in the lift system of the nozzle removal system 300 to control the amount of force exerted between the gas nozzle 108 and the welding torch 102 or a relative position therebetween where the nozzle is secured In another example, the float system is implemented in the lift system of the welding tip changing system 1508 to control the amount of force exerted between the contact tip and the retaining head 110 or a relative position therebetween where the contact tip is secured.

Figure 24:
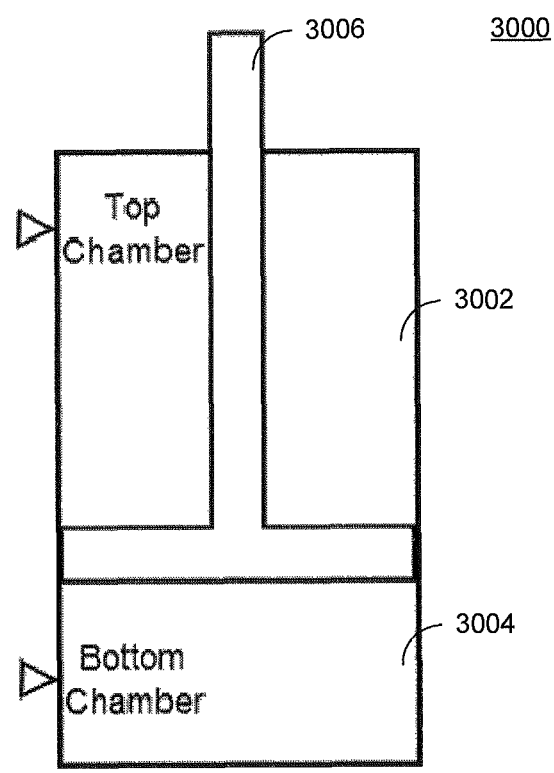
FIG. 24 is an exemplary block diagram of a dual acting single rod cylinder which may be arranged in the nozzle removal system and/or the welding tip changing system.

In one example, the float system is implemented by using a dual acting single rod cylinder 3000 as the cylinder 232, 1534, which includes an upper chamber (or top chamber) 3002, a lower chamber (or bottom chamber) 3004, and a rod 3006, as shown in FIG. 24. The nozzle removal system 300, and tip removal system 1508 are coupled to the dual acting single rod cylinder 232, 1534 via the corresponding carriage 226, 1522.

It will be appreciated by a person skilled in the art that the float system may be implemented by various ways, including, for example, but not limited to, pneumatic means and/or electronic means. The float system may conduct force control based on inputs from one or more means for measuring force exerted in components/objections in the system, which may include, for example, but not limited to, pressure measurements, strain gauges, load cells (e.g, strain gauge load cells, piezoelectric load cells, hydraulic load cells, pneumatic load cells), measuring of spring compression, torque measurements, current measurements on an electric motor that represent the output torque of such a motor. To do so, the float system may use an electronic pressure regulator.

The net force $F_{net}$ experienced by the dual acting single rod cylinder can be expressed as, $$F_{net} = F_{upwards} - F_{downwards}$$

where $F_{upwards}$ represents an upwards force acting on the cylinder, and $F_{downwards}$ represents a downwards force acting on the cylinder.

Since the cylinder is of fixed dimensions, by varying the pressure in both the top and the bottom chambers, the net force will also be varied. And by measuring the pressure in both chambers through the use of pressure sensors, a closed-loop control scheme can be realized for controlling the net force exerted on the cylinder, thereby regulating the net force. When the forces are imbalanced, it creates motion of the cylinder piston position to move along its linear axis.

There are numerous ways of implementing control of the cylinder. In one example a pneumatic cylinder system including 2 pressure sensors, and 4 digital valves are used to operate the cylinder, as described below. The digital solenoid valves are arranged in 2 pairs, where each pair acts as a dump-and-fill system for each of the top and bottom chambers in the cylinder.

Figure 25:
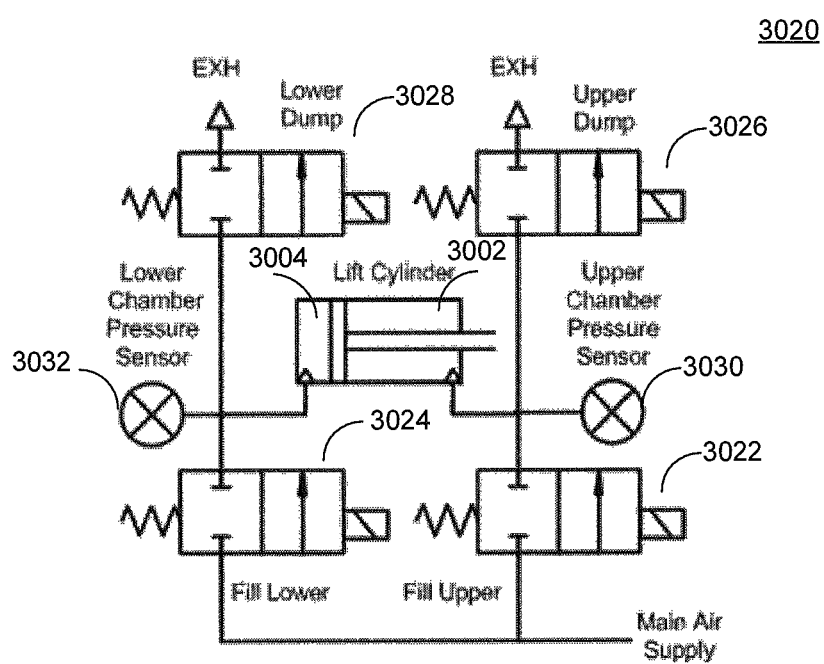
FIG. 25 is a schematic diagram showing one example of a pneumatic cylinder system, which may be applied to the nozzle removal system and/or the welding tip changing system.

FIG. 25 schematically illustrates one example of the implementation of the pneumatic cylinder system, indicated as 3020. A fill valve 3022 and a dump valve 3026 are allocated to the upper chamber 3002. A fill valve 3024 and a dump valve 3028 are allocated to the lower chamber 3004. For the upper chamber 3002, a pneumatic Y-connection connects an external pressure sensor 3030 to the pneumatic line that feeds the chamber so that the pressure contained inside it can be measured. For the lower chamber 3004, a pneumatic Y-connection connects an external pressure sensor 3032 to the pneumatic line that feeds the chamber so that the pressure contained inside it can be measured.

When the fill valve 3022, 3024 is activated, a volume of air is allowed to flow into the corresponding chamber, increasing the pressure applied inside that chamber. When the dump valve 3026, 3028 is activated, a volume of air is allowed to flow out of the corresponding chamber, decreasing the pressure applied inside that chamber. Finally, when all valves are inactive, and pneumatically configured for normally-closed operation, the present volume of air in each chamber is locked in so that a constant pressure can be maintained. A controller, which may be implemented, for example, by a microcontroller, will activate these valves to regulate the pressure within an acceptable pressure range to achieve the desired net force. If the pressure in either chamber falls below some minimum threshold, the fill valve will be activated to increase the pressure in that chamber. In like manner, if the pressure is greater than some maximum threshold, the dump valve will be activated to decrease the pressure in the corresponding chamber until the pressure is acceptable.

Figure 26:
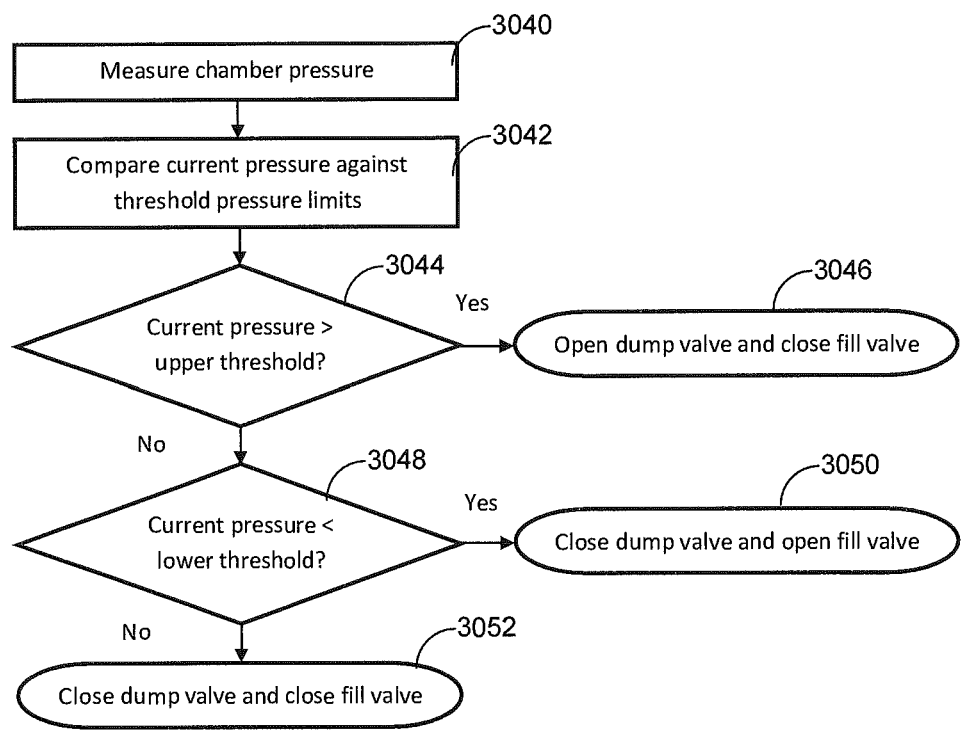
FIG. 26 is a flow chart showing one example of the operation of the pneumatic cylinder system shown in FIG. 25.

FIG. 26 is a flow diagram showing one example of the operation of the pneumatic cylinder system 3020. Chamber pressure in each chamber 3002, 3024 of the cylinder is measured (3040), and each measured pressure is compared with threshold pressure limits (3042) having an upper threshold and a lower threshold. If it is determined that the current pressure is higher than the upper threshold limit (3044) then the system opens the dump valve and closes the fill valve (3046). If it is determined that the current pressure is lower than the lower threshold limit (3048) then the system closes the dump valve and opens the fill valve (3050). If the current pressure is above the lower threshold limit and below the upper threshold limit, the system closes the dump valve and closes the fill valve (3052).

Figure 27:
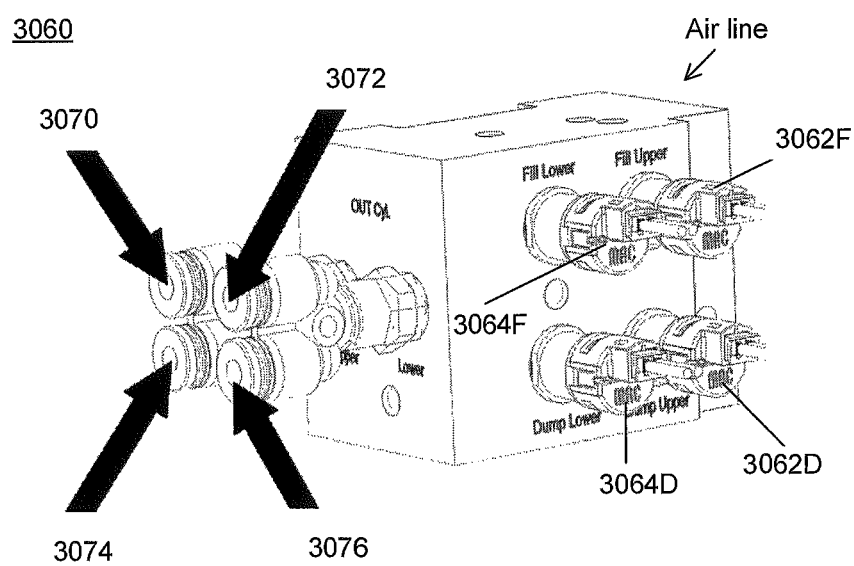
FIG. 27 is a perspective view of one example of a dump and fill system implemented on a manifold block.

FIG. 27 illustrates one example of a dump and fill system implemented on a manifold block, which may be used for the pneumatic cylinder system 3020. The dump and fill manifold 3060 includes two valves 3062D, 3062F in pneumatic communication with the upper chamber of the cylinder 3002 and two valves 3064D, 3064F in pneumatic communication with the lower chamber of the cylinder 3004, one of the two upper/lower valves 3062D, 3064D being a dump valve and the other one of the two upper/lower valves 3062F, 3064F being a fill valve. A main air line (shown in FIG. 27) feeds both upper and lower fill valves 3062F, 3064F. Upper dump valve 3062D is linked to an upper exhaust port (not shown), while lower dump valve 3064D is linked a lower exhaust port (not shown). The pneumatic control line 3070 is linked to both upper dump valve 3062D and upper fill valve 3062F; and pneumatic control line 3072 is linked to both lower dump valve 3064D and lower fill valve 3064F. The pneumatic control line 3074 is linked to the pressure sensor for the upper chamber. The pneumatic control line 3076 is linked to the pressure sensor for the lower chamber.

For each air inlet (234, 1538) of the cylinder 3000 (232, 1534), air can travel both ways. When the piston in the cylinder 232, 1534 is to be actuated, both fill valves 3062F, 3064F are modulated to add air into their pneumatically connected chambers and both dump valves 3062D, 3064D are modulated to release air from their pneumatically connected chambers.

Figure 28:
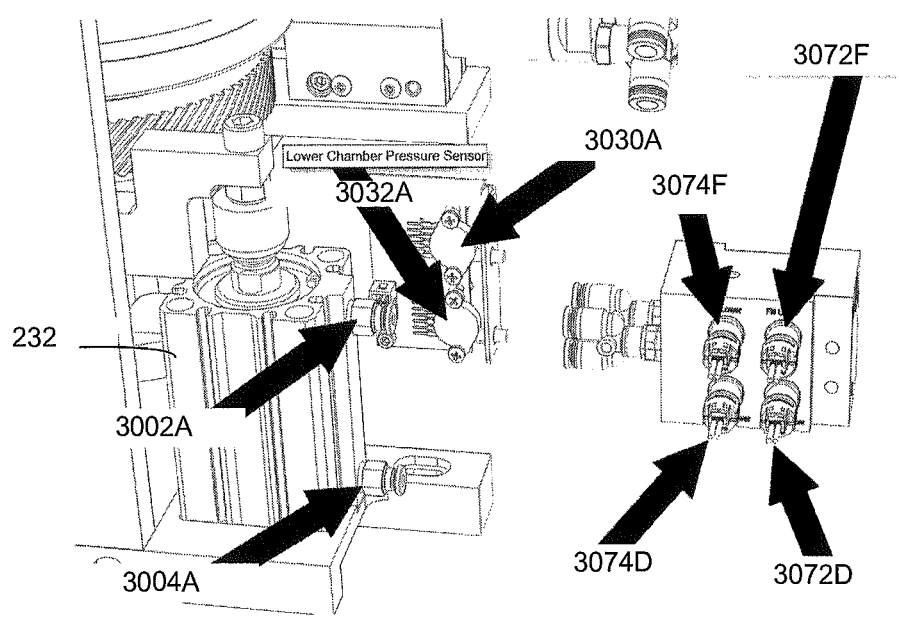
FIG. 28 is a perspective view of one example of the implementation of the nozzle removal system with the dump and fill system and the pneumatic cylinder system.

FIG. 28 illustrates one example of the implementation of the nozzle removal system 300 with the dump and fill system and the pneumatic cylinder system 3020. The cylinder 232 includes an air inlet (234) for an upper chamber 3002A and an air inlet (234) a lower chamber 3004A which correspond to the upper chamber 3002 and the lower chamber 3004 of the chamber 3000. The float system for this implementation includes an upper chamber pressure sensor 3030A and a lower chamber pressure sensor 3032A which correspond to the upper chamber pressure sensor 3030 and the lower chamber pressure sensor 3032 of the pneumatic cylinder system 3020. The cylinder 232 is operated using a dump and fill system having valves 3072D, 3072F, 3074D, and 3074F, which corresponds to a dump and fill system 3060 having values 3062D, 3062F, 3064D, and 3064F.

Figure 29:
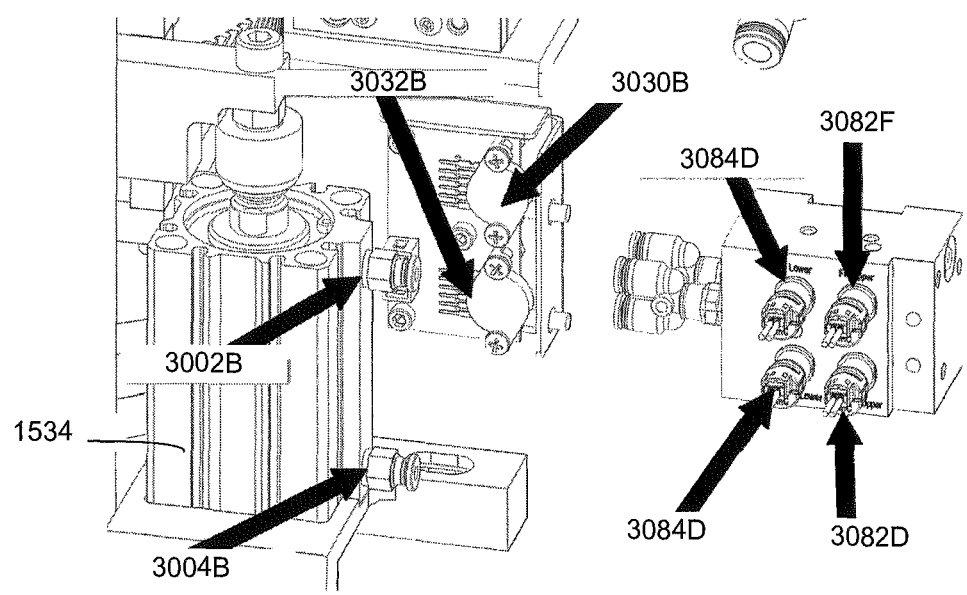
FIG. 29 is a perspective view of one example of the implementation of the welding tip changing system with the dump and fill system and the pneumatic cylinder system.

FIG. 29 illustrates one example of the implementation of the welding tip changing system 1508 with the dump and fill system and the pneumatic cylinder system 3020. The cylinder 1534 includes an air inlet (1538) for an upper chamber 3002B and an air inlet (1538) for a lower chamber 3004B which correspond to the upper chamber 3002 and the lower chamber 3004 of the chamber 3000. The float system for this implementation includes an upper chamber pressure sensor 3030B and a lower chamber pressure sensor 3032B which correspond to the upper chamber pressure sensor 3030 and the lower chamber pressure sensor 3032 of the pneumatic cylinder system 3020. The cylinder 1534 is operated using a dump and fill system having valves 3082D, 3082F, 3084D, and 3084F, which corresponds to a dump and fill system 3060 having valves 3062D, 3062F, 3064D, and 3064F.

Figure 30:
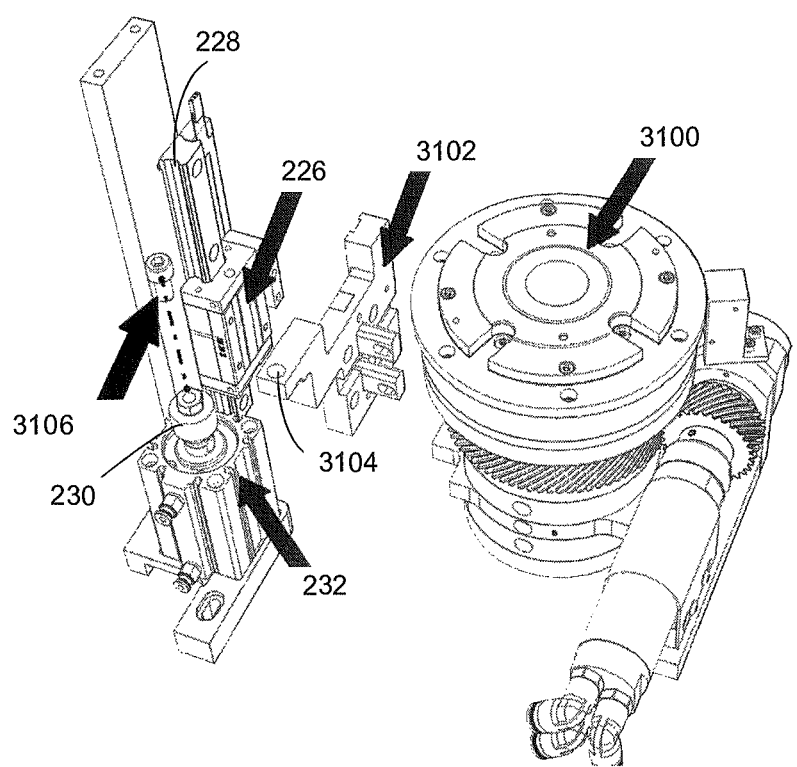
FIG. 30 is an exploded view of the nozzle removal system, which shows how its rotary module is directly mounted to the cylinder rod.

To assume that the force experienced by the rotary modules is equal to the force exerted by the cylinder, these 2 assemblies are directly physically connected. FIG. 30 shows how the module is directly mounted to the cylinder rod through the use of a mounting plate and a screw in the nozzle removal system 300. The central module 3100 of the nozzle removal system 300 represents the cylinder load of the cylinder 232 using a central module mount plate 3102 having a hole 3104. The cylinder rod and the central module mount plate 3102 are physically connected by a screw 3106.

Figure 31:
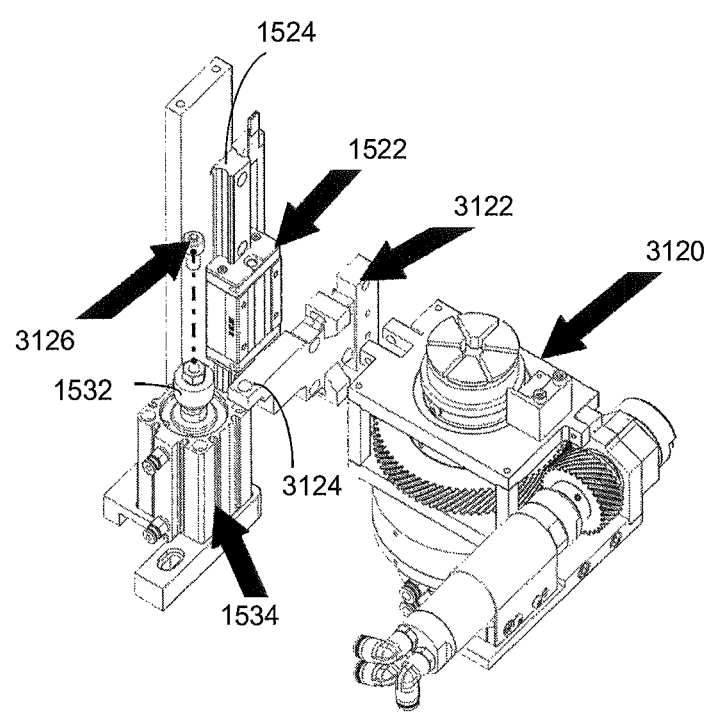
FIG. 31 is an exploded view of the welding tip changing system, which shows how its rotary module is directly mounted to the cylinder rod.

FIG. 31 shows how the module is directly mounted to the cylinder rod through the use of a mounting plate and screw in the welding tip changing system 1508. The central module 3120 of the welding tip changing system 1508 is coupled to the cylinder rod of the cylinder 1534 using a central module mount plate 3122 having a though hole 3124. The cylinder rod and the central module mount plate 3122 are physically connected by a screw 3126.

By controlling the cylinder in a certain manner, a relation may be found between the duty cycle of a pulse-width modulated (PWM) control signal the valves and the pressure contained in the chamber as a result of the valve pulsing. In one example, the cylinder may be controlled by a PWM control scheme.

In the above description, the nozzle 108 is used to describe the welding torch maintenance center; however, the pneumatic float system may be utilized with various types of nozzle. For example, slip-on, push-fit, or friction held nozzles may be usable. For this type of nozzle, no rotary motion is required to remove the nozzle, though it may reduce the amount of force required to overcome the frictional forces applied. It can simply be measured how much force is required to remove and/or replace the nozzle. Once this measurement is obtained, it can be translated into this force-controlled system, the amount of force desired during the operation of removing/replacing the nozzle.

For bayonet-locking nozzle fastening, a turn then pull sequence must be implemented when removing the nozzle. It is important during this turning movement that any linear or rotational forces be controlled so that damage does not occur to the locking pins/track, but that there is a sufficient amount of each force to overcome frictional loads while the pins travel through the track.

Common to both machines, is the sequence that is implemented for fastening/unfastening a threaded connection between the nozzle and torch in the nozzle removal system 300 but also between the contact tip, and mating threads (usually the retaining head) to which the contact tip is secured in the welding tip changing system 1508. During the removal/replacement sequences of these machines, it is important to minimize the forces exerted between the threaded objects so that they do not self-lock in an undesirable state. By "floating" the rotary module during these sequences with a minimal amount of force, the module will be free to move linearly due to the threading action created by the module's rotational movement. It is also critical to minimize the force exerted when the 2 objects make contact to minimize the risk of cross-threading.

In the exemplary implementation the float system is configured to ensure the positional accuracy with which the cylinder can be moved. Linear position readings of the module may be taken with an analog linear potentiometer that also represent where the cylinder piston lies along its stroke. Since changing the force with which the module moves changes the acceleration with which it moves, some simple velocity control may be implemented that allows for increasing or decreasing the module's linear rate of motion especially near points where the position of the module is critical. For example in the nozzle removal system 300, position control is implemented when grabbing the nozzle. Particularly if the nozzle is a bottleneck style, the nozzle is grabbed sufficiently above the tapered end of the nozzle so that it can be clamped firmly, and concentrically. In the welding tip changing system 1508, position control is implemented after the spent contact tip has been disposed of and the new tip is to be grabbed by the rotary module. A pneumatic gripper is mounted to another cylinder that serves as a means to shuttle a new tip from where the tip is dispensed to where the tip is to be picked up by the rotary module. The tip is grabbed in a precise location that is suitable to the length of the tip, the physical shape of the tip, and suitable to the length of travel of the cylinder driving the rotary module. If the module travels too high when picking up the new tip, it may collide with the tip shuttle gripper, or it may not be able to travel high enough to contact the mating threads of the retaining head. If the module does not move far enough when picking up the tip, either it may grab the tip incorrectly or not at all creating other issues. The system described herein is configured to avoid the foregoing undesirable situations. Mechanical hard stops may also be implemented to avoid the foregoing undesirable situations.

Any processing of the disclosure may be implemented by causing a processor, digital signal processors (DSP), application-specific integrated circuit (ASIC), or components of a processor for operating the systems of FIGS. 1-31 to execute a computer program or provide functions. In this case, a computer program product can be provided to a computer or a mobile device using any type of non-transitory computer readable media. The computer program product may be stored in a non-transitory computer readable medium in the computer or the network device. Non-transitory computer readable media include any type of tangible storage media. Examples of non-transitory computer readable media include magnetic storage media (such as magnetic tapes, hard disk drives, flash memory, etc.), optical magnetic storage media (e.g. magneto-optical disks), compact disc read only memory (CD-ROM), compact disc recordable (CD-R), compact disc rewritable (CD-R/W), digital versatile disc (DVD), Blu-ray (registered trademark) disc (BD), and semiconductor memories (such as mask ROM, programmable ROM (PROM), erasable PROM), flash ROM, and RAM). The computer program product may also be provided to a computer or a network device using any type of transitory computer readable media. The term "configured to (perform a task)" as used herein includes being programmable, programmed, connectable, wired or otherwise constructed to have the ability to perform the task when arranged or installed as described herein.

While one or more embodiments have been provided in the present disclosure, it may be understood that the disclosed systems and methods may be embodied in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented. A number of variations and modifications can be made without departing from the scope of the invention as defined in the claims.

What is claimed is:

1. A system for servicing a welding torch, the system comprising:
    a gripping module for holding and releasing a component of the welding torch, the gripping module be movable along an axis of the gripping module and rotatable about the axis of the gripping module; and
    a dual acting single rod cylinder comprising a first chamber and a second chamber;
    a control system for controlling the cylinder for generating movement of the gripping module along the axis of the gripping module, thereby providing a degree of freedom in the movement of the gripping module to control or reduce a force exerted between mating components of the welding torch when removing or replacing the component,
    the control module comprising:
        a first module for monitoring and/or regulating air pressure or air volume in the first chamber of the cylinder, and
        a second module for monitoring and/or regulating air pressure or air volume in the second chamber of the cylinder.

2. The system according to claim 1, wherein the control system is configured to perform a force control and/or a position control in a closed loop manner or an open loop manner.

3. The system according to claim 1, wherein the control system comprises at least one of:
    a module for generating a motion of the gripping module along the axis of the gripping module, independently of a rotation motion of the gripping module;
    a monitor for monitoring the movement of the gripping module;
    a regulator for regulating the movement of the gripping module; and
    a module for compensating for mismatch between the linear motion of the two mating components and the rotational motion of the two mating components.

4. The system according to claim 1, wherein the control system comprises a float system.

5. The system according to claim 1, wherein the control system is configured to perform a force control or a position control using the cylinder.

6. The system according to claim 5, wherein the system for serving the welding torch is configured to use the force control to move the position of the gripping module to a first position or to use the position control so that the amount of force reaches a first value.

7. The system according to claim 1, wherein the control system comprises at least one of:
    a monitor for measuring air pressure or air volume in the cylinder, or a position of the cylinder;
    a module for regulating air pressure or air volume in the cylinder, or a position of the cylinder; and
    a module for controlling a valve system allocated to the cylinder.

8. The system according to claim 1, wherein the control module comprises:
    a first fill and dump system for controlling pressure or volume of air in the first chamber, and
    a second fill and dump system for controlling pressure or volume of air in the second chamber.

9. The system according to claim 1, wherein the control system comprises means for operating the first module and the second module separately.

10. The system according to claim 1, wherein the gripping module is configured to remove a nozzle from the welding torch or to replace the nozzle.

11. The system according to claim 1, wherein the gripping module is configured to remove a welding tip from the welding torch or to replace the welding tip with another welding tip.

12. The system according to claim 1, further comprising at least one of:
    a welding tip magazine for storing a new or replacement welding tip;
    a tip shuttle means for delivering a welding tip; and
    a tip and retaining head cleaning module for cleaning a welding tip and/or a retaining head of the welding torch.

13. A method for the system of claim 1 to serve a welding torch, the method comprising:
    operating the gripping module by using a motion along an axis of the gripping module and a rotational motion about the axis of the gripping module so that the gripping module holds and releases a component of the welding torch; and
    performing a motion control of the gripping module by using the control system and the cylinder to provide a degree of freedom in a movement of the gripping module, thereby controlling or reducing a force exerted between mating components of the welding torch when removing or replacing the component.

14. The method according to claim 13, wherein performing a motion control of the gripping module comprises at least one of:
    performing a force control and/or a position control in a closed loop manner or an open loop manner;
    generating a motion of the gripping module along the axis of the gripping module, independently of a rotation motion of the gripping module;
    monitoring the movement of the gripping module; and
    regulating the movement of the gripping module.

15. The method according to claim 13, wherein performing a motion control of the gripping module comprises:
    controlling the cylinder for generating a motion of the gripping module along the axis of the gripping module;
    monitoring air pressure or air volume in the cylinder, or a position of the cylinder;
    regulating air pressure or air volume in the cylinder, or a position of the cylinder;
    comparing a measured current pressure with threshold pressure limits having an upper threshold and a lower threshold; and
    based on the comparison, operating the cylinder.

16. The method according to claim 15, wherein each of the first chamber and the second chamber comprises a dump valve and a fill valve, wherein performing a motion control of the gripping module comprises: in each chamber, in response to determining that the current pressure is higher than an upper threshold limit, opening the dump valve and closing the fill valve;

in response to determining that the current pressure is lower than a lower threshold limit, closing the dump valve and opening the fill valve; and in response to determining that the current pressure is higher than the lower threshold limit and lower than the upper threshold limit, closing both the dump valve and the fill valve.

17. The system according to claim 4, wherein the float system comprises a pneumatic control means, hydraulic control means, magnetic control means, electronic control means and/or mechanical control means.

* * * * *